(12) United States Patent
Kato et al.

(10) Patent No.: US 8,097,657 B2
(45) Date of Patent: Jan. 17, 2012

(54) ORGANIC POLYMER POROUS MATERIAL AND METHOD FOR PRODUCING THE SAME

(75) Inventors: Shinji Kato, Sakura (JP); Shin Ogasawara, Sakura (JP)

(73) Assignees: DIC Corporation, Tokyo (JP); Kawamura Institute of Chemical Research, Sakura-shi (JP)

( * ) Notice: Subject to any disclaimer, the term of this patent is extended or adjusted under 35 U.S.C. 154(b) by 0 days.

(21) Appl. No.: 13/059,779

(22) PCT Filed: Aug. 3, 2009

(86) PCT No.: PCT/JP2009/063722
§ 371 (c)(1),
(2), (4) Date: May 5, 2011

(87) PCT Pub. No.: WO2010/021234
PCT Pub. Date: Feb. 25, 2010

(65) Prior Publication Data
US 2011/0207842 A1    Aug. 25, 2011

(30) Foreign Application Priority Data

Aug. 19, 2008 (JP) ................................. 2008-210603
Aug. 19, 2008 (JP) ................................. 2008-210605

(51) Int. Cl.
*C08J 9/28* (2006.01)
*C08F 299/02* (2006.01)

(52) U.S. Cl. ............ 521/61; 521/64; 521/155; 521/157; 521/159; 521/163; 524/403; 525/422; 525/423; 525/424; 525/426; 525/428; 525/430; 528/65; 528/76; 528/85; 528/422

(58) Field of Classification Search ...................... 521/62, 521/64, 155, 157, 159, 163; 524/403; 525/422, 525/423, 426, 428, 430; 528/65, 76, 85, 528/422
See application file for complete search history.

(56) References Cited

U.S. PATENT DOCUMENTS

| 5,705,667 A |   | 1/1998 | De Haen et al. |
|---|---|---|---|
| 5,886,064 A |   | 3/1999 | Rheinberger et al. |
| 6,077,500 A | * | 6/2000 | Dvornic et al. ............... 525/424 |
| 6,288,197 B1 | * | 9/2001 | Youngs et al. .................. 528/25 |
| 6,881,810 B2 | * | 4/2005 | Matsunami et al. ............ 528/85 |
| 6,924,347 B2 | * | 8/2005 | Morgan et al. .................. 528/65 |

FOREIGN PATENT DOCUMENTS

| JP | 07-267879 A | 10/1995 |
|---|---|---|
| JP | 08-231864 A | 9/1996 |
| JP | 11-140180 A | 5/1999 |
| JP | 11-510429 A | 9/1999 |
| JP | 2000-063513 A | 2/2000 |
| JP | 2006-022367 A | 1/2006 |
| JP | 2008-212764 A | 9/2008 |
| WO | WO-93/14147 A1 | 7/1993 |
| WO | WO-00-02656 A2 | 1/2000 |
| WO | WO-2004/110930 A1 | 12/2004 |

OTHER PUBLICATIONS

Shinji Ogasawara et al., "Synthesis of high specific surface area porous polymer containing dendrimer and its application to catalyst," Polymer Preprints, Japan(CD-ROM), Sep. 9, 2008, vol. 57, No. 2, Disk1, p. 3M03 and English translation thereof.
S. Huh et al., "Cooperative Catalysis by General Acid and Base Bifunctionalized Mesoporous Silica Nanospheres," Angew. Chem. Int. Ed., 2005, 44, 1826-1830.
Shinji Ogasawara et al., "Dendrimer-Integrated Microporous Polymers That Reveal High-Specific Surface Area: Fabrication Methodology and Their Application in Catalytic Chemical Transformation," Polymer Preprints, Japan(CD-ROM), Sep. 9, 2008, vol. 57, No. 2, Disk1, p. 3M03.
International Search Report dated Sep. 8, 2009, issued for PCT/JP2009/063722.

* cited by examiner

*Primary Examiner* — Irina S Zemel
(74) *Attorney, Agent, or Firm* — Edwards Wildman Palmer LLP

(57) ABSTRACT

The present invention relates to organic polymer porous materials, and in particular, to an organic polymer porous material that functions as a reusable insoluble solid catalyst and a method for producing the same. The organic polymer porous material of the present invention is characteristic in that the amount of immobilized bases is high and the specific surface area is large. The object has been achieved by an organic polymer porous material including a polymer ($P_A$) obtained by polymerizing a polymerizable composition (A) containing a compound (a) obtained by reacting a dendrimer (a1) having at least an amino group as a reactive functional group or a polyethyleneimine (a2) having at least an amino group as a reactive functional group with a compound (a3) having a vinyl group and a group that can react with the reactive functional group.

10 Claims, 2 Drawing Sheets

20nm 10,000×  1.00 μm

US 8,097,657 B2

ORGANIC POLYMER POROUS MATERIAL AND METHOD FOR PRODUCING THE SAME

TECHNICAL FIELD

The present invention relates to organic polymer porous materials, and in particular, to an organic polymer porous material that functions as a reusable insoluble solid catalyst and a method for producing the same.

BACKGROUND ART

Nucleophilic addition reaction of aldehydes and ketones catalyzed by bases is a carbon-carbon bond-generating reaction and is recognized as one of the most important catalytic reactions for organic synthesis of the present day. Heterogeneous reacting systems that use solid catalysts on which basic functional groups such as an amino group are immobilized are advantageous for repeated use since catalysts can be easily separated and recovered from solutions upon completion of the reaction, and are thus extensively studied.

In general, aldehydes and ketones are known to exhibit improved activity to nucleophilic addition reactions due to the decrease in electronic density on oxygen of carbonyl units contained therein by the action of proton acids, Lewis acids, and hydrogen-bonding proton donors. Actually, NPL 1 discloses that silica gel having a surface into which both an amino (base)-containing silane compound and a urea bond (hydrogen bonding proton donor)-containing silane compound are introduced functions as a highly active solid catalyst for nucleophilic addition reactions such as aldol reactions of aldehydes.

A dendrimer (a1) typically exemplified by a poly(amidoamine) dendrimer and a poly(propylene imine) dendrimer and a straight-chain or branched polyethyleneimine (a2) are amino-containing organic polymers and are useful molecules in which plural amino groups can be highly densely incorporated in one molecule. Polymerizable compounds (a) prepared from such a dendrimer (a1) and a polyethyleneimine (a2) have been known; for example, PTL 1 describes an energy-curable compound having a polymerizable vinyl group at a terminus of a molecular chain of a poly(amidoamine) dendrimer or a poly(propylene imine) dendrimer and discloses a technology of using this compound as a material for a film-forming material such as paint and ink, a sealant, a molding agent, an adhesive, a resin for a tackiness agent, a curing agent for a heat/radiation-curable resin composition, or a reactive diluent. PTL 2 discloses examples of using a poly(amidoamine) dendrimer or a poly(propylene imine) dendrimer immobilized on an insoluble carrier as a stabilizing scavenger for generating metal particles. PTL 3 discloses examples of using a hydro gel formed by a polymer having a straight-chain polyethyleneimine skeleton as a carrier for generating metal particles.

However, a technique for forming these compounds into organic polymer porous materials having large specific surface areas and a technique of using the porous materials as base catalysts to be used in nucleophilic addition reactions of aldehydes and ketones have not been disclosed.

Furthermore, chemical reactions using catalysts containing transition metals such as palladium, platinum, ruthenium, rhodium, gold, silver, and rhenium are recognized as the most important catalytic reaction for organic synthesis of the present day, as is representatively shown by carbon-carbon coupling reactions. In reacting systems that use transition metal catalysts, a homogeneous catalyst in which a transition metal catalyst is dissolved in a reaction solution is usually used. However, since transition metal catalysts are generally expensive, they are preferably used repeatedly. Since a catalyst is dissolved in a reaction solution according to a homogeneous catalyst, separation and recovery of the catalyst after reaction is not easy. Accordingly, studies have been made on use of heterogeneous catalysts in which transition metal catalysts are immobilized on insoluble solids.

PTL 4 reports an example of synthesizing a poly(amidoamine) dendrimer (a1) on a surface of silica gel and adsorption and incorporation of a salt of a metal, such as palladium, into the dendrimer. According to this technique, operation for synthesizing the dendrimer is complicated and the metal content in the silica gel is not necessarily high.

PTL 2 described above reports an example of incorporating metal nanoparticles in silica gel by allowing a poly(propylene imine) dendrimer, into which nanoparticles of a metal such as palladium had been introduced in advance, to be present during the course of porous silica gel preparation by a sol-gel reaction. According to this technique, the metal content in the silica gel is not necessarily high since an alkoxysilane compound, i.e., a silica raw material, is used in excess.

Citation List

Patent Literature
  PTL 1: Japanese Unexamined Patent Application Publication No. 2000-63513
  PTL 2: WO2004/110930
  PTL 3: Japanese Unexamined Patent Application Publication No. 2006-22367
  PTL 4: WO00-2656
Non Patent Literature
  NPL 1: S. Huh et al., Angew. Chem. Int. Ed., 2005, 44, 1826-1830.

SUMMARY OF INVENTION

Technical Problem

An object of the present invention is to provide an organic polymer porous material having a large specific surface area and containing a large amount of immobilized bases, a catalyst that uses the organic polymer porous material and exhibits high durability in repeated use for nucleophilic addition reactions of aldehydes and ketones, and a method for producing the porous material and the catalyst.

Another object of the present invention is to provide an organic polymer porous material that has a high metal content and includes metal nanoparticles that can be easily prepared, an insoluble solid catalyst that uses the porous material and exhibits high durability in repeated use for coupling reactions of halogenated aryls, and methods for producing the porous material and the catalyst.

Solution to Problem

The inventors of the present invention have made extensive studies and found that an organic polymer porous material including a polymer obtained from a polymerizable composition containing a polymerizable compound having amino and vinyl groups can resolve the problems described above. Thus, the present invention has been made.

The present invention provides an organic polymer porous material including a polymer ($P_A$) obtained from a polymerizable composition (A) containing a polymerizable compound (a) having amino and vinyl groups, wherein the polymerizable compound (a) is a compound obtained by reacting (1) a dendrimer (a1) having a tertiary amino group and a reactive functional group ($Q_1$) or a polyethyleneimine (a2) having a reactive functional group ($Q_1$), and (2) a compound (a3) having a vinyl group and a reactive functional group ($Q_2$) that can react with the reactive functional group ($Q_1$).

The present invention also provides an organic polymer porous material containing metal nanoparticles complexed with the polymer ($P_A$).

The present invention also provides a catalyst that includes the organic polymer porous material.

The organic polymer porous material of the present invention can be produced by polymerizing an organic polymer porous material-forming composition (X), i.e., a mixture of a polymerizable composition (A) containing a polymerizable compound (a) having amino and vinyl groups and a solvent (M) that is compatible with the polymerizable composition (A) but does not dissolve or swell the polymer ($P_A$) of the polymerizable composition (A), and then removing the solvent (M) (step (α-1)).

A first method includes preparing an organic polymer porous material-forming composition (Y), i.e., a mixture of a polymerizable composition (A) containing a polymerizable compound (a) having amino and vinyl groups, a metal compound (b), and a solvent (M) that is compatible with the polymerizable composition (A) and the metal compound (b) but does not dissolve or swell a polymer ($P_A$) obtained from the polymerizable composition (A), polymerizing the composition (Y) while reducing the metal compound (b) at the same time to generate metal nanoparticles, and removing the solvent (M) to form an organic polymer porous material (step (β-1)).

The present invention also provides a method for producing an organic polymer porous material containing metal nanoparticles, the method including sequentially performing (1) a step (α-1) of polymerizing an organic polymer porous material-forming composition (X) prepared by mixing a polymerizable composition (A) containing a polymerizable compound (a) having amino and vinyl groups and a solvent (M) that is compatible with the polymerizable composition (A) but does not dissolve or swell a polymer ($P_A$) obtained from the polymerizable composition (A) so as to form an organic polymer porous material, and then removing the solvent (M), a step (β-3) of bringing the organic polymer porous material into contact with a solution (I) containing a metal compound (b) to allow the metal compound (b) to adsorb onto the organic polymer porous material and then separating the organic polymer porous material from the solution (I), and (2) a step (β-4) of bringing the organic polymer porous material into contact with a solution (H) containing a reductant (c) to reduce the metal compound (b) to generate metal nanoparticles, and then separating the generated organic polymer porous material containing the metal nanoparticles from the solution (H).

Advantageous Effects of Invention

According to the present invention, since the polymerizable compound (a) obtained by reacting a dendrimer (a1) or a polyethyleneimine (a2) and a compound (a3) having a vinyl group and being capable of reacting with the reactive functional groups contained in the dendrimer (a1) or the polyethyleneimine (a2), an organic polymer porous material having a large number of immobilized amino groups can be provided. Moreover, the polymerizable compound (a) into which the vinyl group is introduced is introduced into the organic polymer porous material by covalent bonding through polymerization reactions. Thus, inevitably, amino groups are stably immobilized in the organic polymer porous material. Since the dendrimer (a1) or the polyethyleneimine (a2) can include a plurality of amino groups in one molecule at a high density, it is easy to introduce acid groups or hydrogen-bonding proton donor groups into the vicinities of the amino groups through derivatization. Thus, an organic polymer porous material having high catalytic activity for nucleophilic addition reactions of aldehydes and ketones can be provided.

Since the number of immobilized amino groups in the organic polymer porous material of the present invention is large, a porous material having a high metal content can be provided by utilizing metal adsorption onto the amino groups. Since the polymerization reaction of the compound (a3) and the reduction reaction of the metal are conducted simultaneously, an organic polymer porous material containing metal nanoparticles can be easily produced. When such an organic polymer porous material is used, a catalyst having a high activity for coupling reactions of halogenated aryls can be provided.

DESCRIPTION OF EMBODIMENTS

Figure 1:
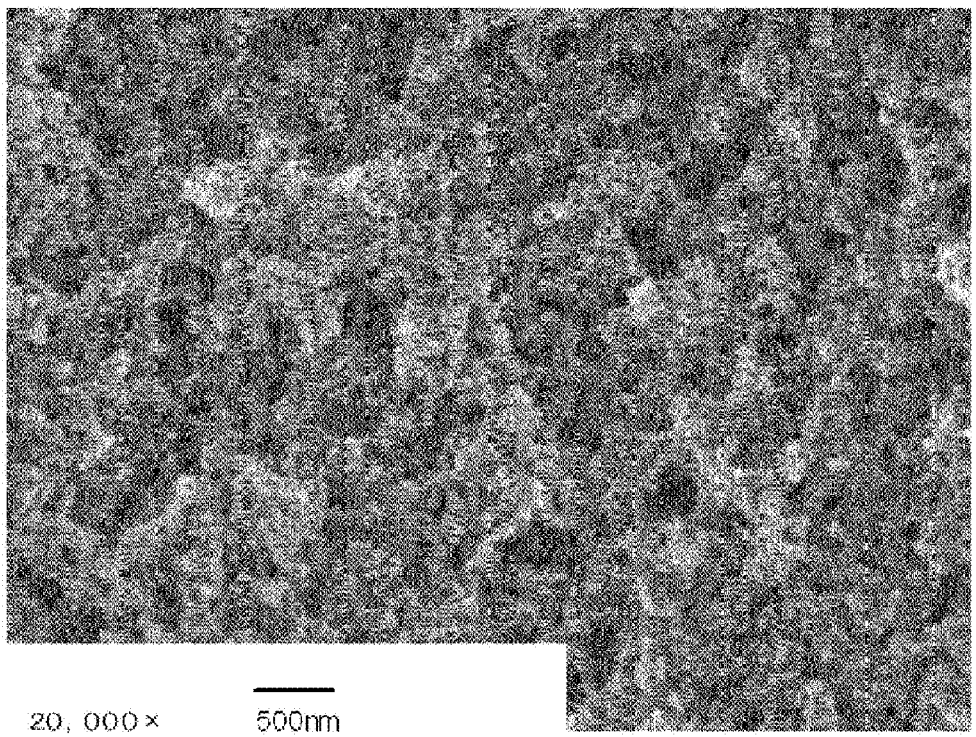
FIG. 1 is a scanning electron microscope image of an organic polymer porous material [P-1] obtained in Example 1.

Essential features for implementing the present invention will now be described.
[Structure of Organic Polymer Porous Material]

An organic polymer porous material of the present invention is an organic polymer porous material prepared from a polymer ($P_A$) obtained from a polymerizable compound (a) having amino and vinyl groups, in which the polymerizable compound (a) is a compound obtained by reacting a dendrimer (a1) having a tertiary amino group and a reactive functional group ($Q_1$) or a polyethyleneimine (a2) having a reactive functional group ($Q_1$) and a compound (a3) having a vinyl group and a reactive functional group ($Q_2$) that can react with the reactive functional group ($Q_1$).

A "dendrimer" is a tree-like branching molecule and is a generic name of molecules that have a monodisperse molecular weight and include a core at the center of branching and branches that are regularly and successively branching from the core. The dendrimer (a1) used in the present invention is not particularly limited as long as it is a molecule that has a tertiary amino group and a reactive functional group ($Q_1$) and is identified as a dendrimer as defined above. Examples thereof include compounds that have basic structures composed of dendrimers described in literatures such as G. R. Newkome, C. N. Moorefield, F. Vogtle, Dendrimers and Dendrons: Concepts, Syntheses, Applications (published 2001 by Wiley-VCH), and J. M. J. Frechet, D. A. Tomalia, Dendrimers and Other Dendritic Polymers (Wiley Series in Polymer Science) (published 2002 by John Wiley & Sons). However, a dendrimer including, as a repeating unit, an amidoamine structure represented by formula (1) or a propyleneimine structure represented by formula (2) below is preferably used.

[Chem. 1]

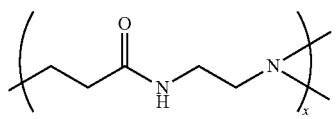

(1)

(in formula (1), x is an integer of 1 to 10)

[Chem. 2]

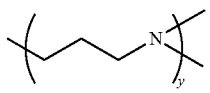

(2)

(in formula (2), y is an integer of 1 to 10).

Commercially available reagents such as dendrimers listed in a reagent catalog available from Sigma-Aldrich Co., may be used as the aforementioned dendrimer. If needed, dendrimers may be synthesized according to purposes.

Examples of the commercially available reagents include polyamidoamine (PAMAM) dendrimers, ethylenediamine core, generation 3 (product code 412422) represented by formula (3) and generation 4 (product code 412449) represented by formula (4), 1,6-diaminohexane core, generation 4 (product code 596965) represented by formula (5), cystamine core, generation 4 (product code 648043) represented by formula (6), hydroxyl-terminated ethylenediamine core, generation 4 (product code 477850) represented by formula (7), and a sodium salt of carboxylic acid-terminated ethylenediamine core, generation 3.5 (product code 412430) represented by formula (8), and a propyleneimine dendrimer, generation 1 (product code 460699) represented by formula (9) produced by Sigma-Aldrich.

(3)
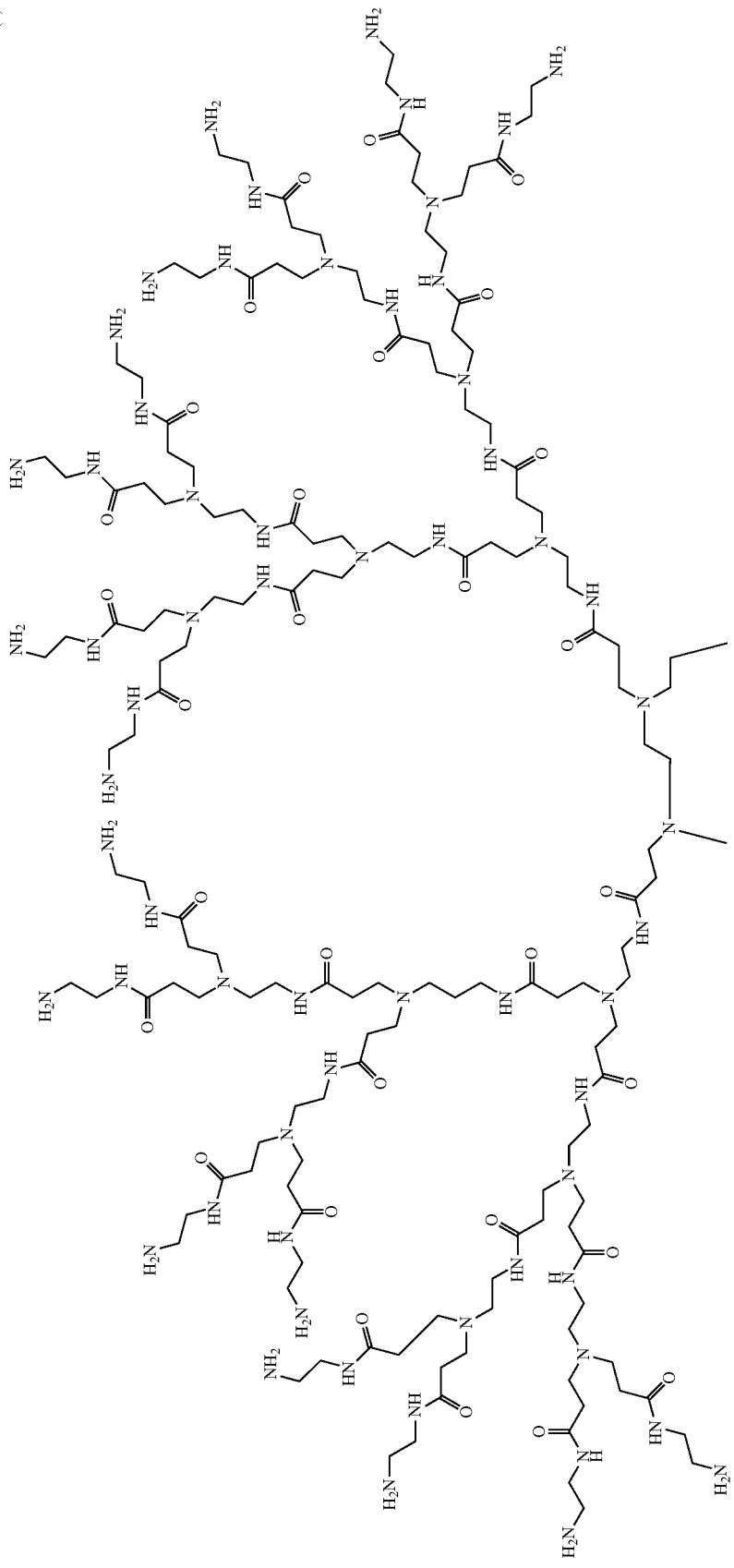

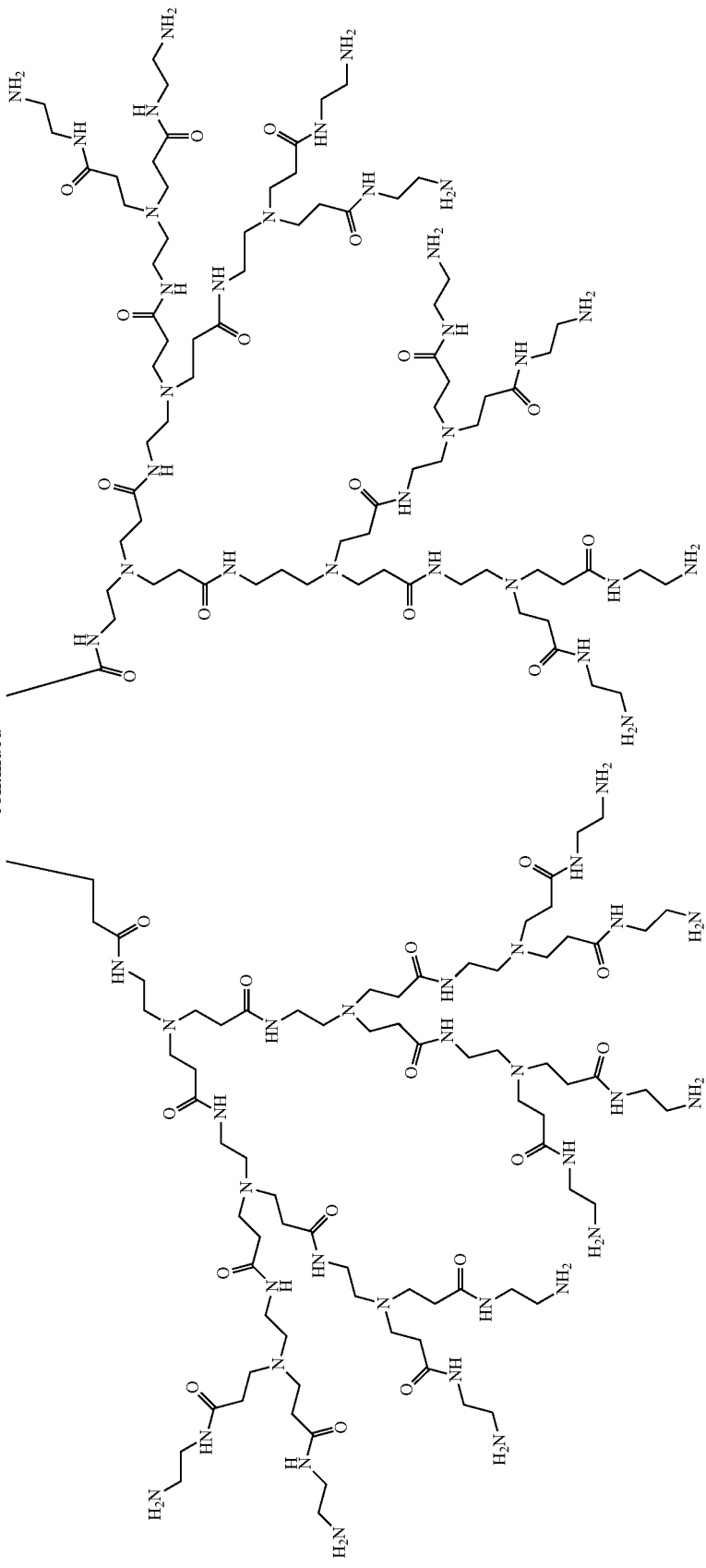

-continued
[Chem. 4]
(4)
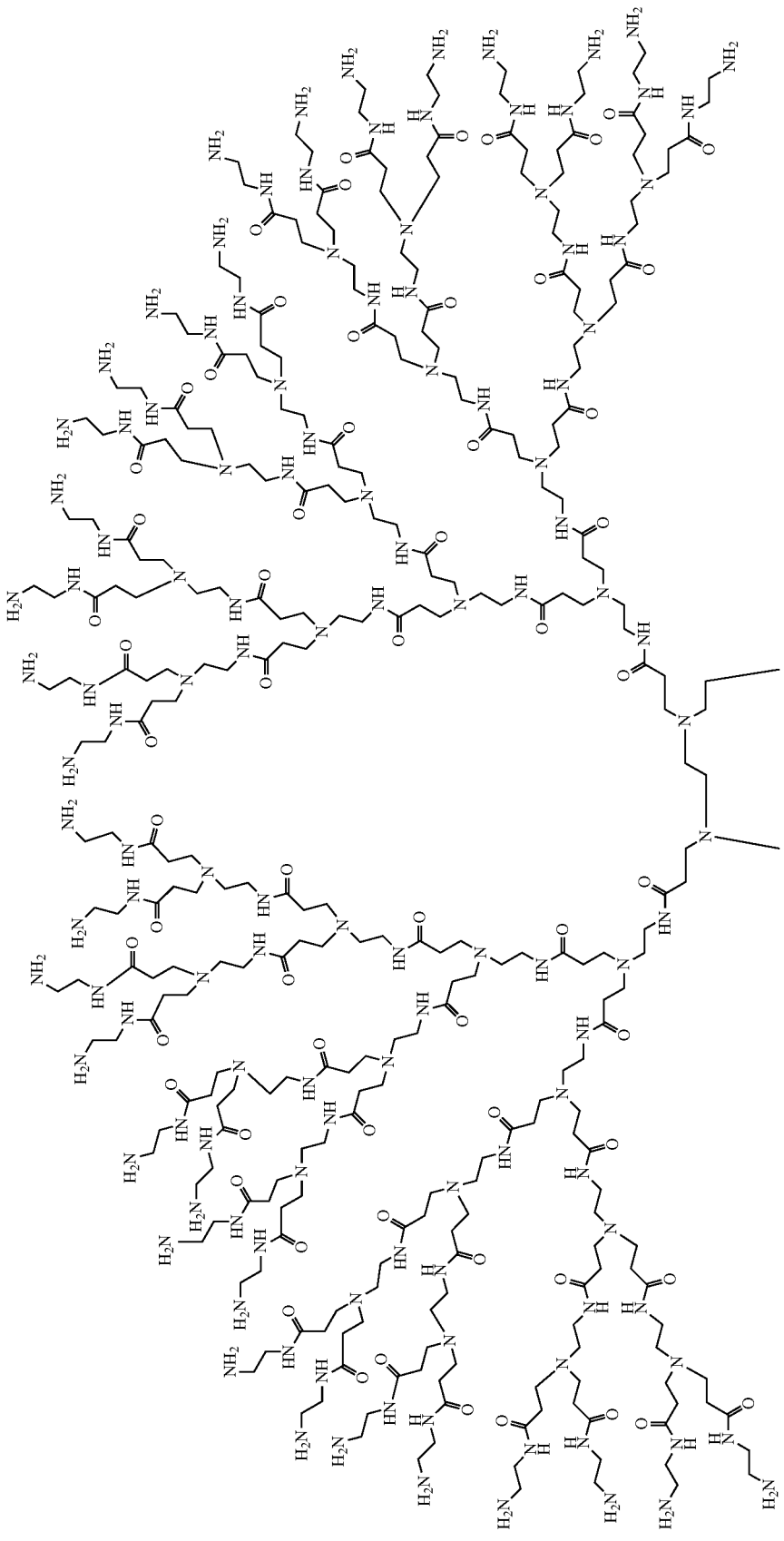

-continued
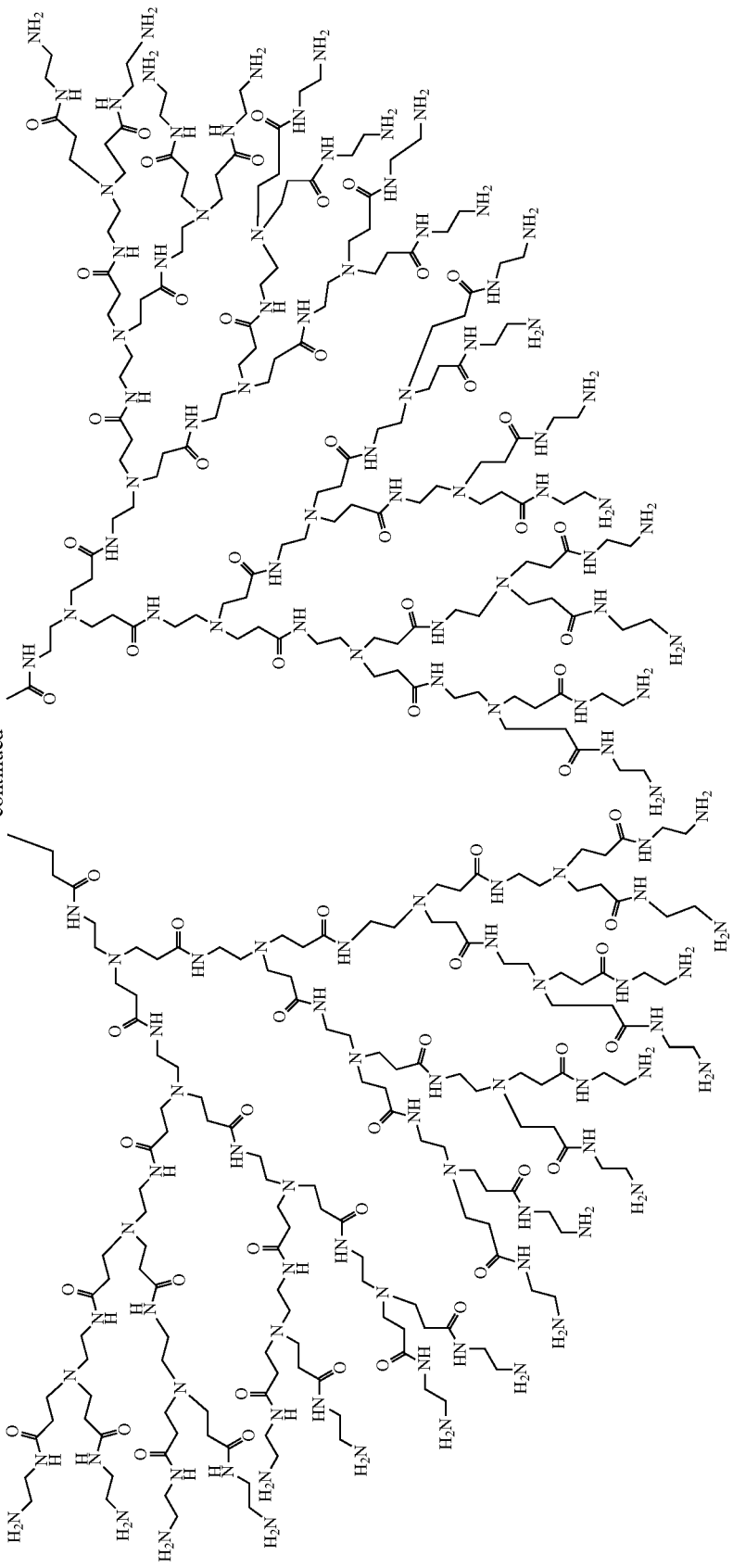

[Chem. 5]
(5)
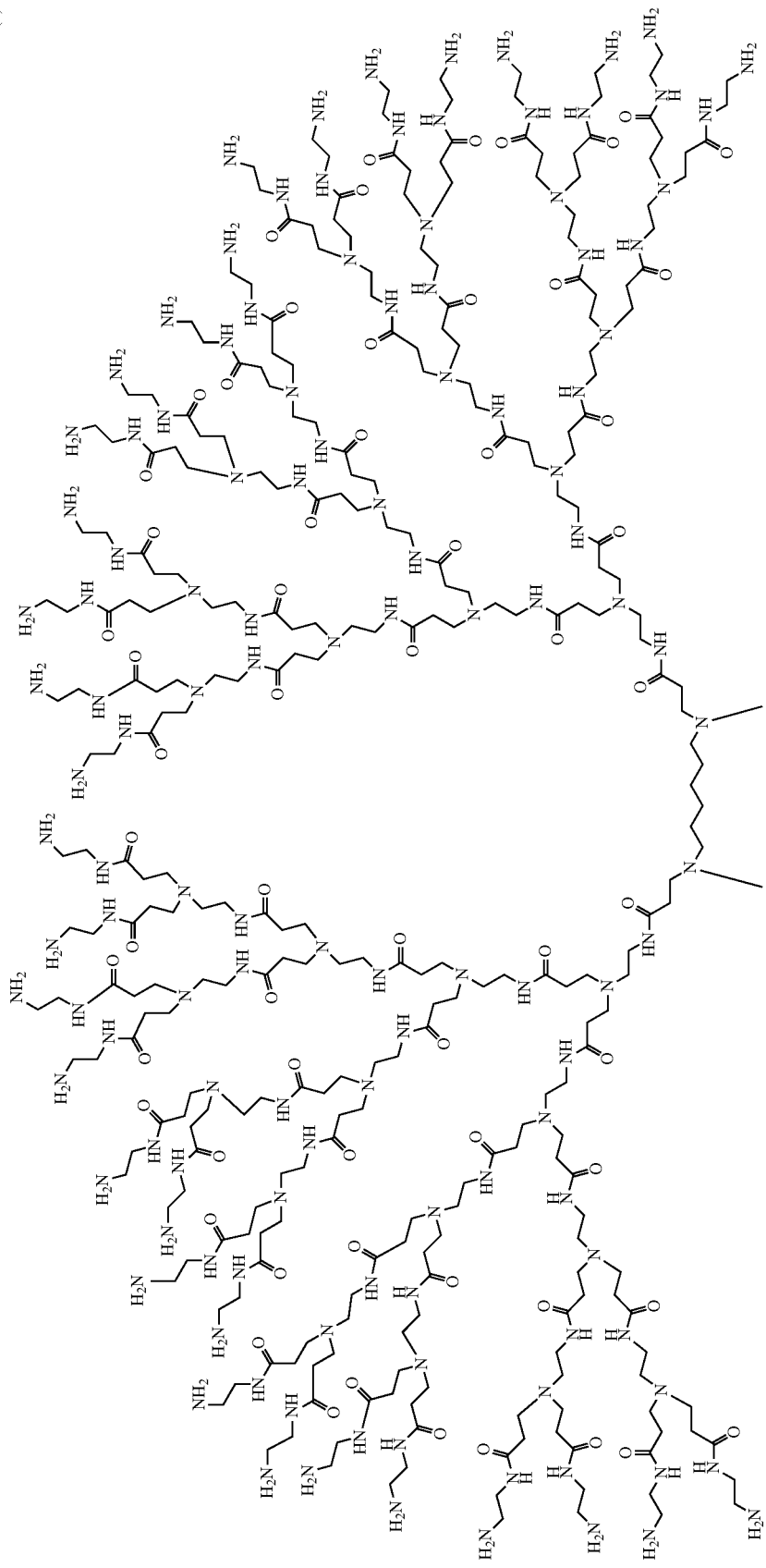

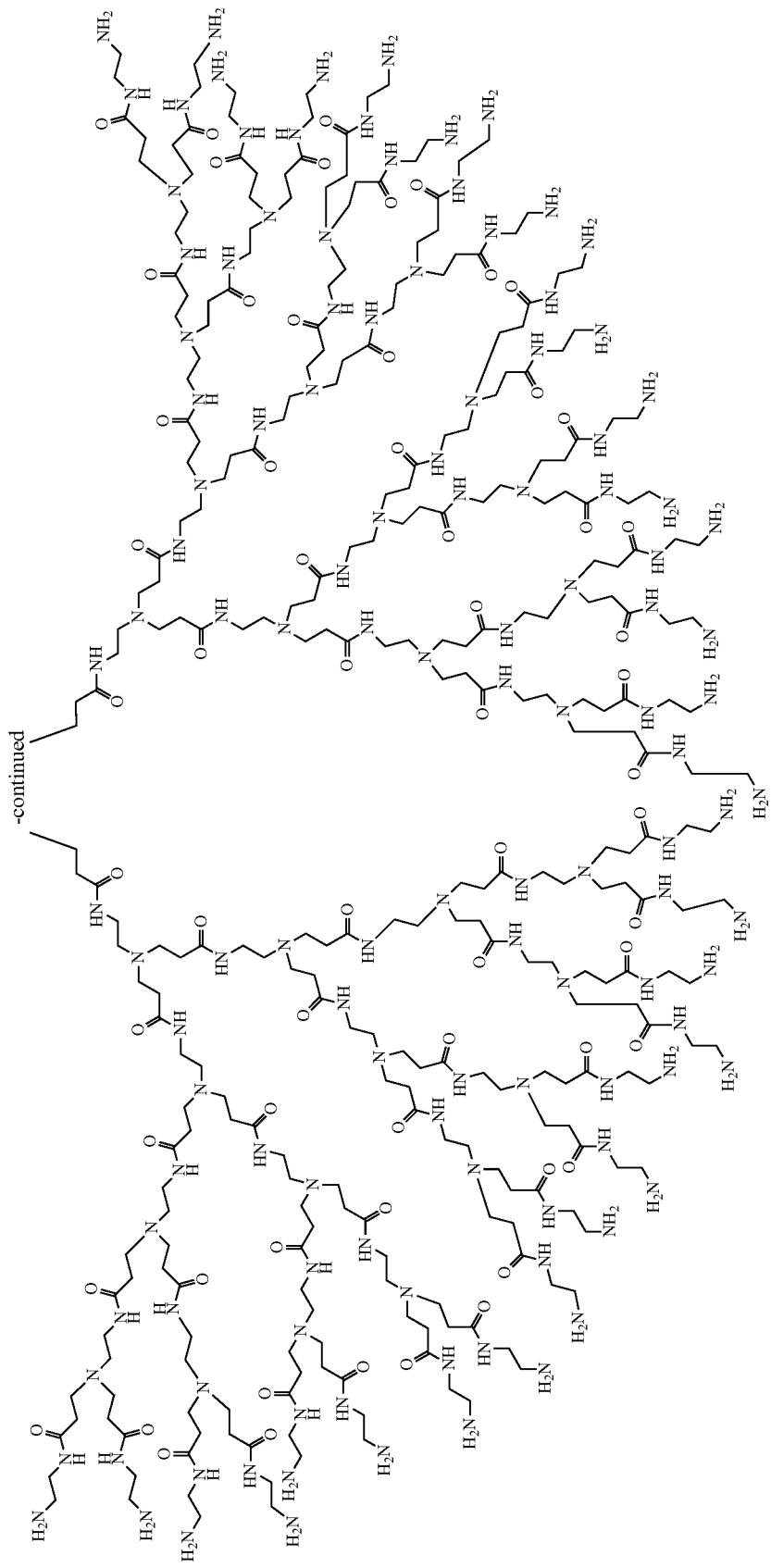
-continued

[Chem. 6]
-continued
(6)
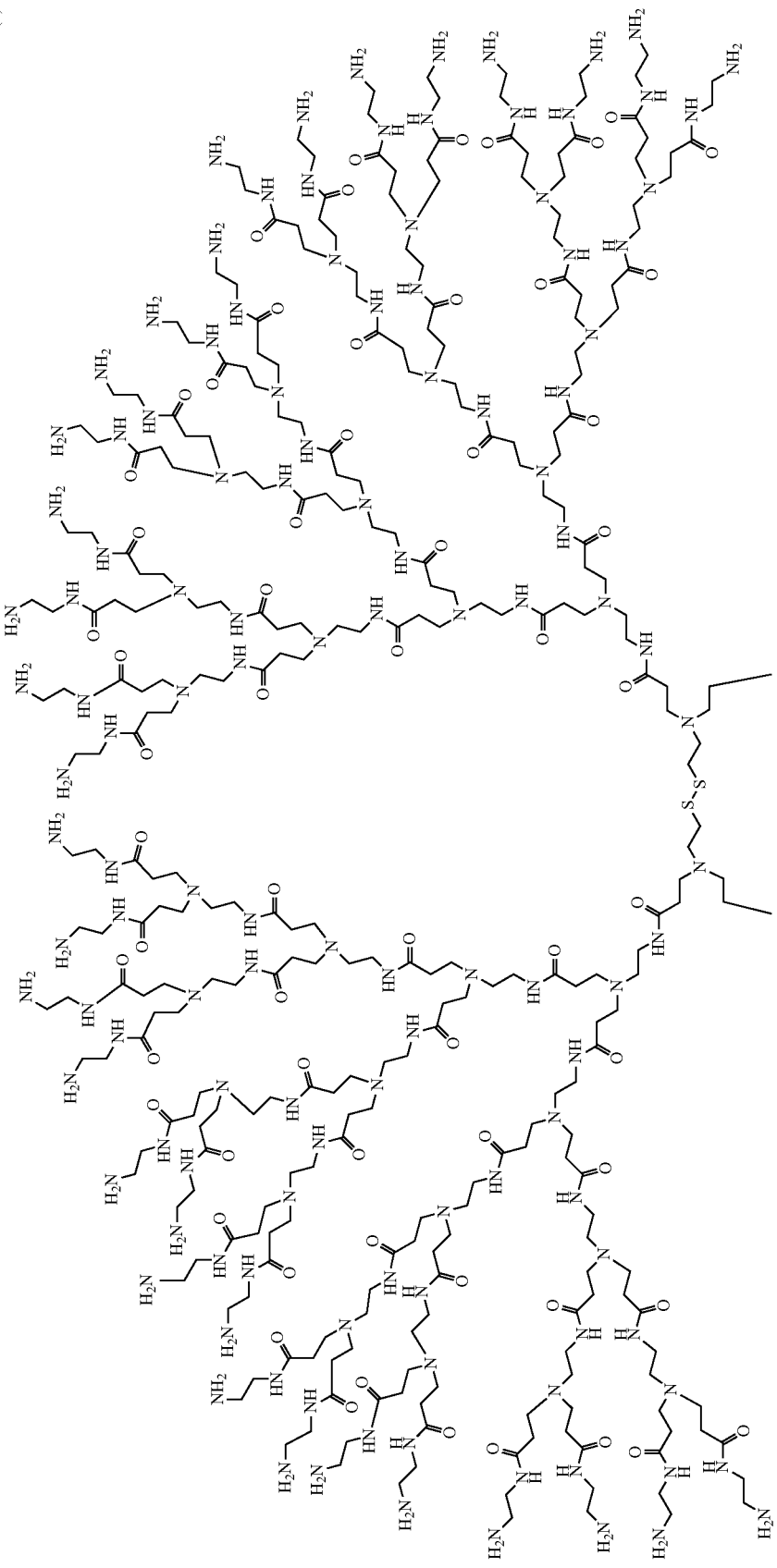

-continued
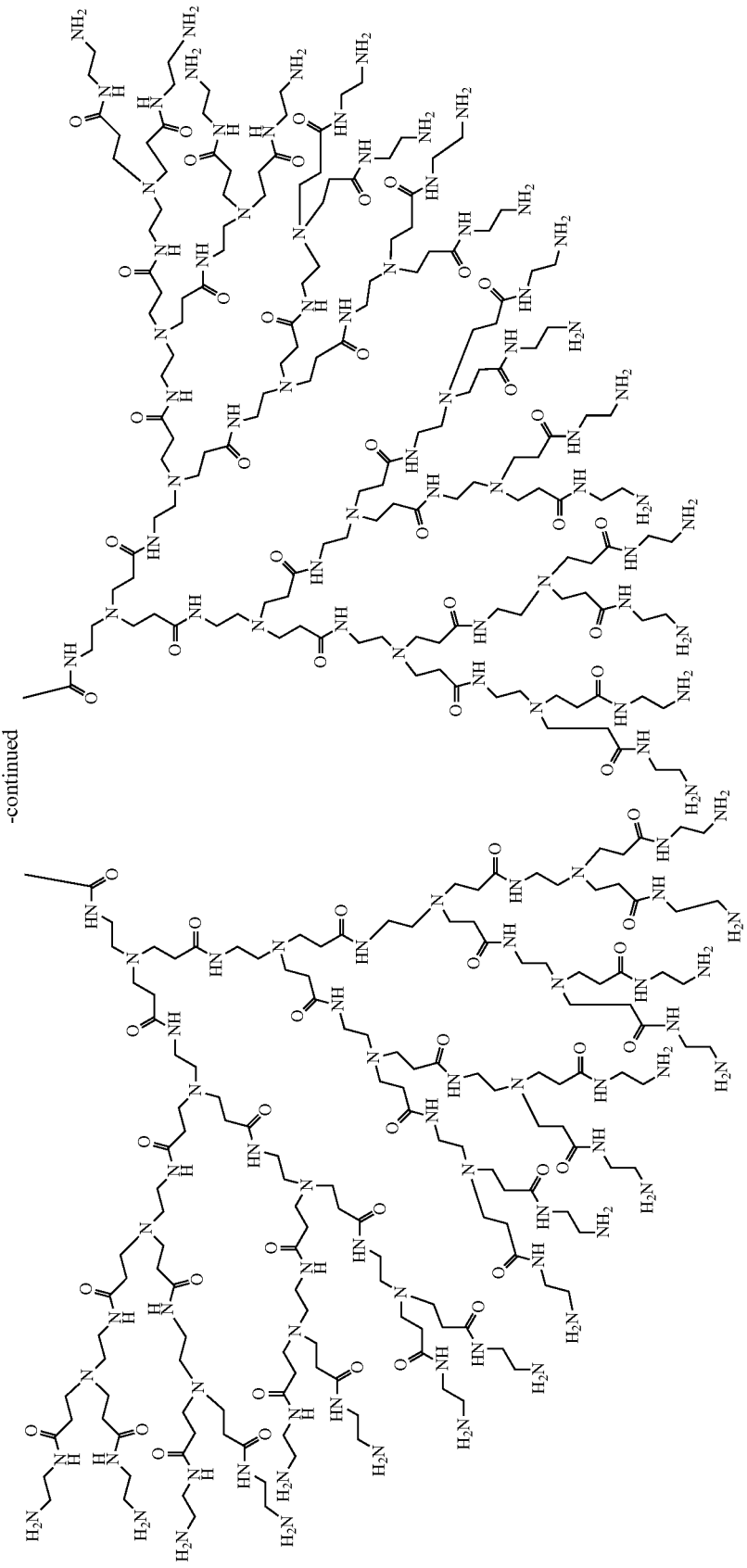

-continued
(7)
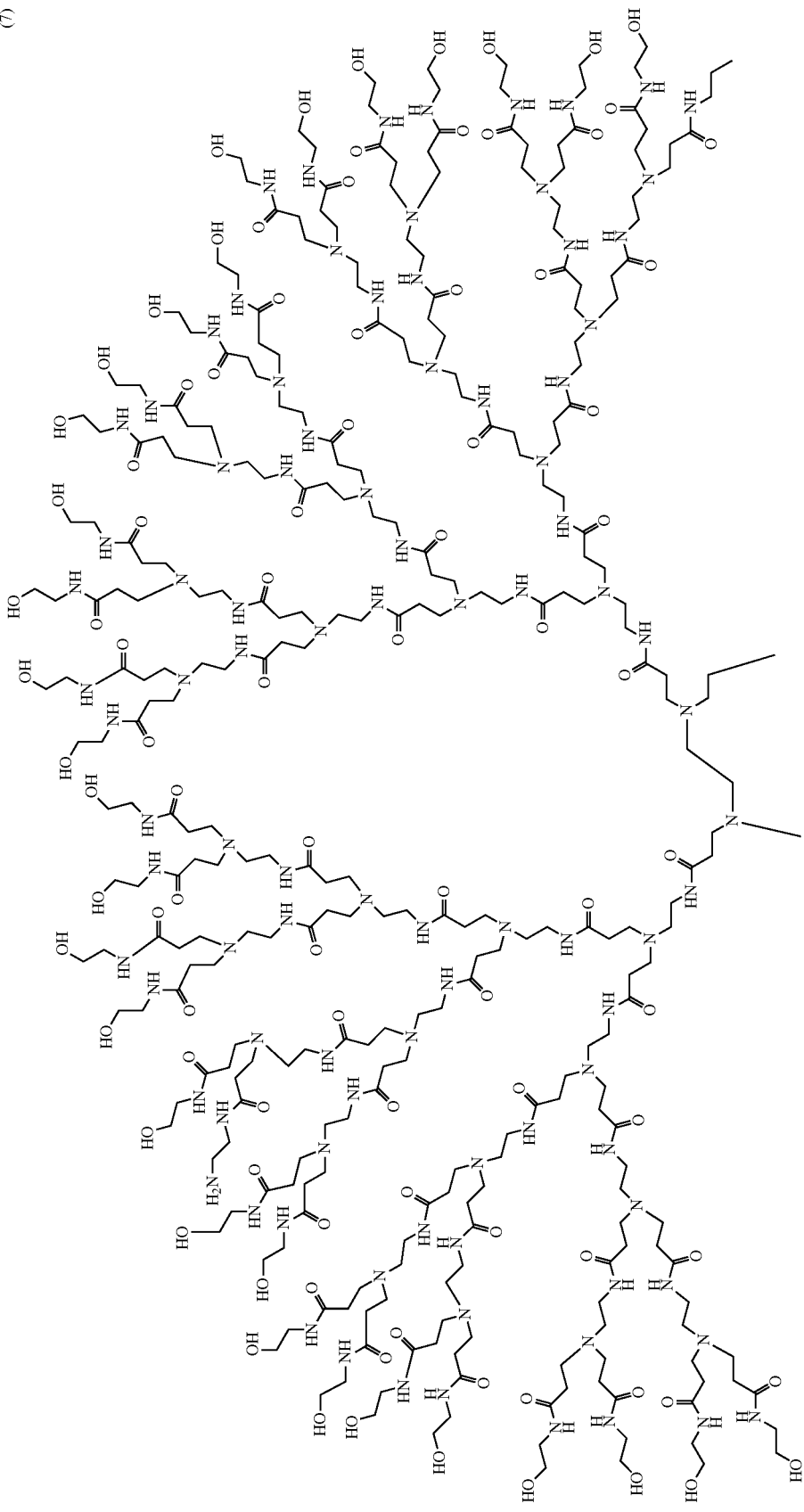

-continued
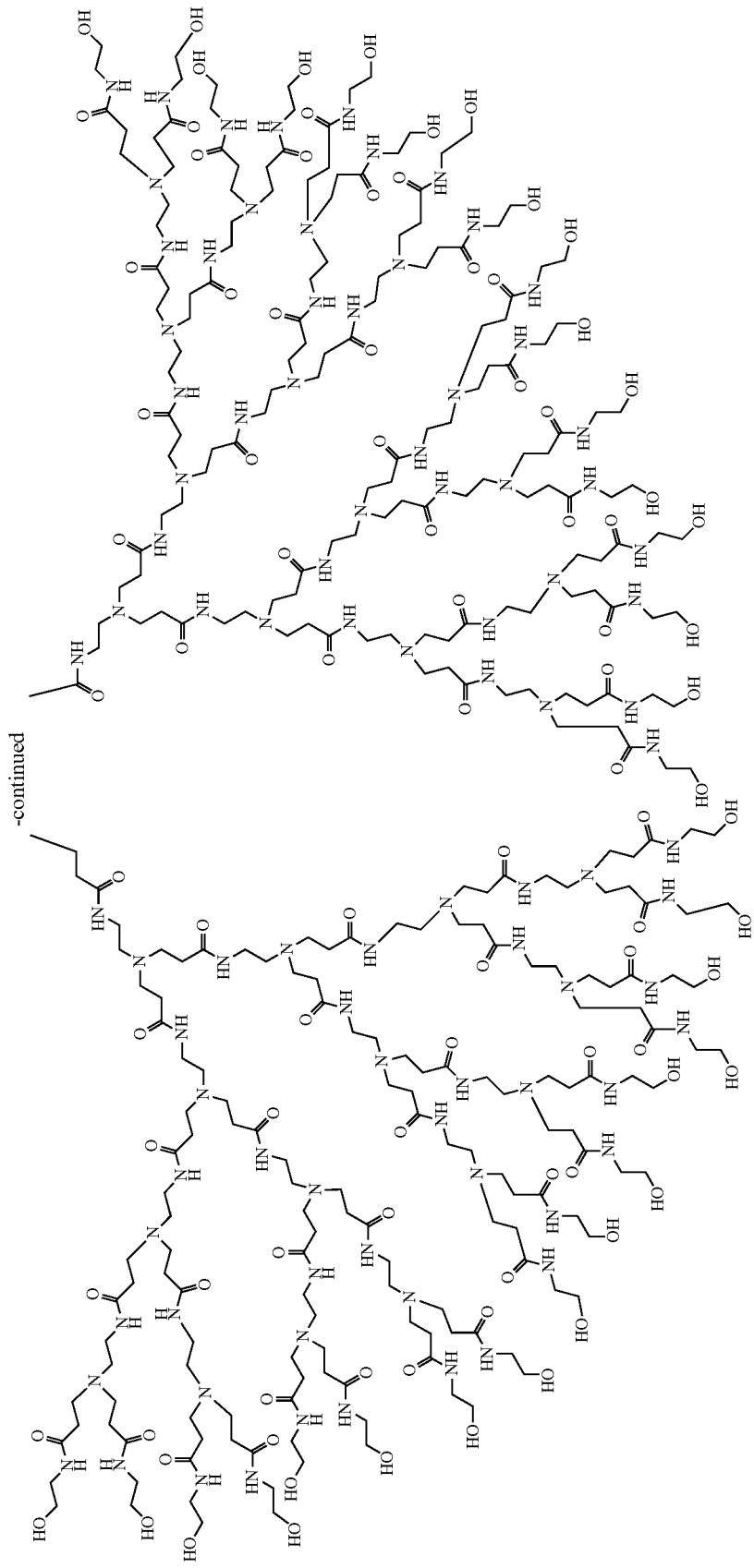

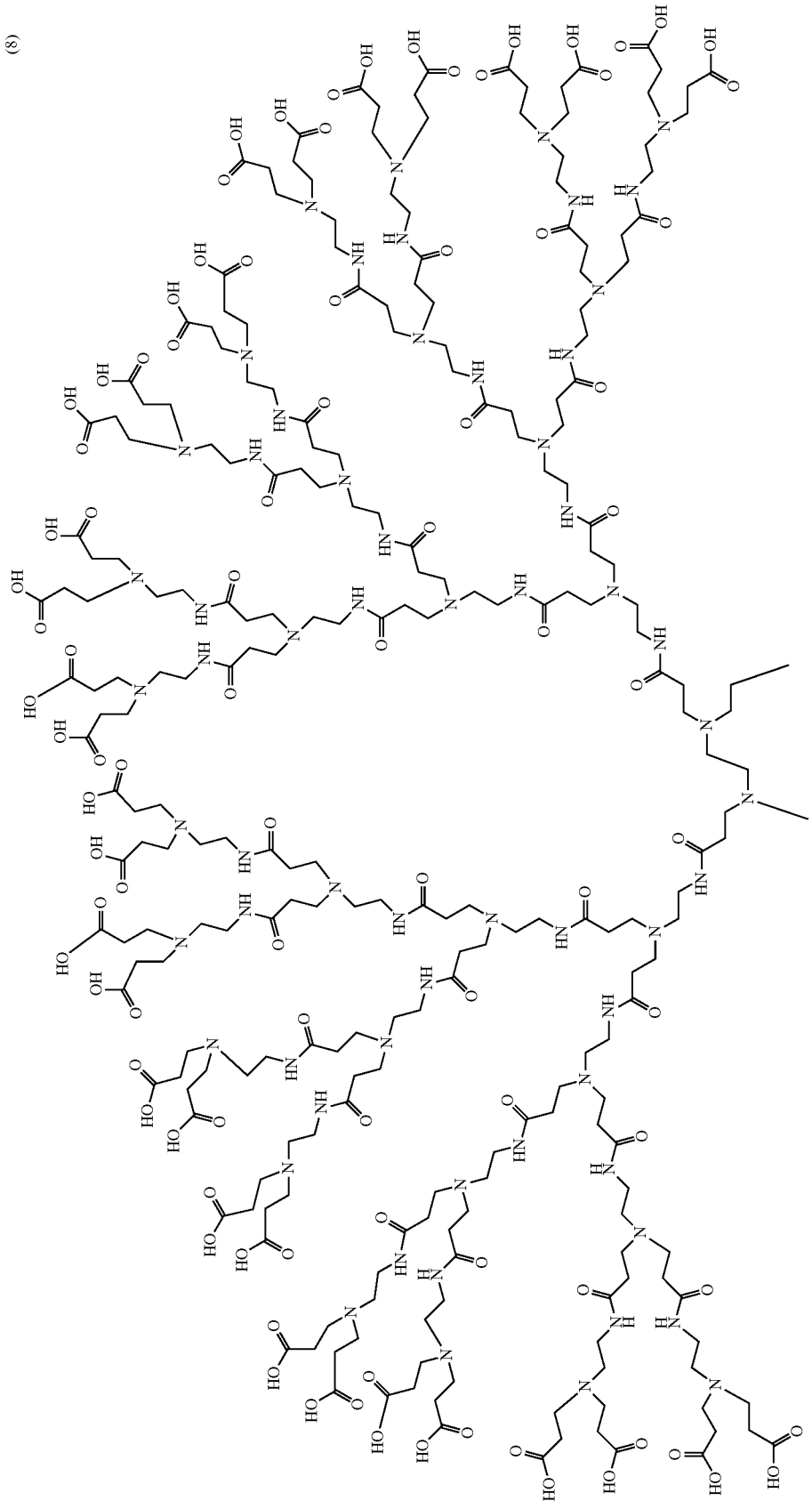
[Chem. 8]
(8)

-continued
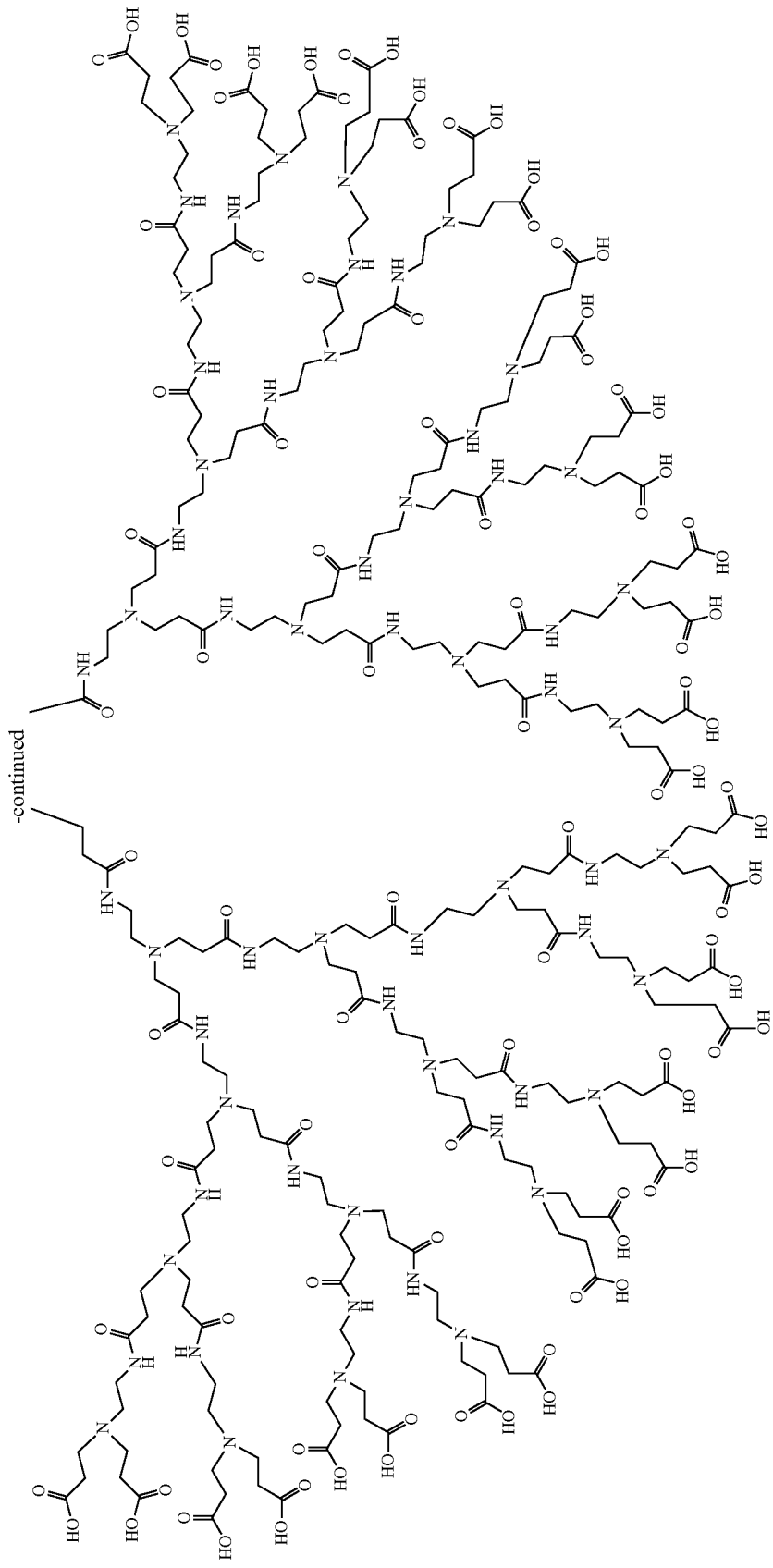

[Chem. 9]

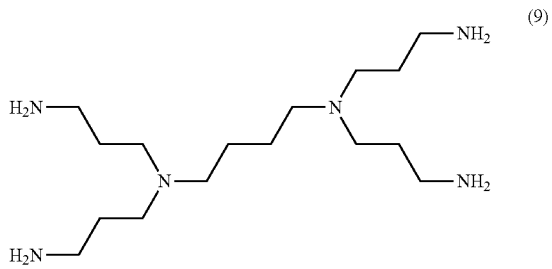

(9)

There is no particular limit on the technique for synthesizing a dendrimer of an amidoamine structure represented by formula (1), and, for example, techniques disclosed in Japanese Unexamined Patent Application Publication Nos. 7-267879 and 11-140180 may be used. First, the Michael addition is carried out on a compound having primary amino and functioning as a core so that the compound is converted into a compound having a nitrogen branch and a methyl ester moiety by allowing 2 equivalents of methyl acrylate to act on the amino groups therein. Next, the methyl ester moiety is reacted with one of primary amino groups of a primary amino-containing diamine compound to form an amide bond while leaving the other primary amino group at a terminus. Then the Michael addition and the amide bond-generating reaction are alternately performed a desired number of times to prepare a dendrimer having an amidoamine structure.

There is no particular limit on the technique for synthesizing a dendrimer of a propyleneimine structure represented by formula (2), and, for example, techniques disclosed in WO-A93/14147 and WO-A95/2008 may be used. First, acrylonitrile is allowed to act on a compound having primary amino and functioning as a core to form a cyanoethylated compound. The nitrile group is then reduced to a primary amino group using hydrogen or ammonia in the presence of a catalyst. Then the cyanoethylation and reduction of nitrile are alternately performed a desired number of times to prepare a dendrimer having a propyleneimine structure.

The core structure of the dendrimer is not particularly limited but is preferably a core structure that uses ammonia, ethylenediamine, 1,4-diaminobutane, 1,6-diaminohexane, 1,12-diaminododecane, or a cystamine residue.

The reactive functional group ($Q_1$) that bonds to a terminus of a dendrimer is preferably bonded to a terminus. The reactive functional group is not particularly limited as long as it can give a polymerizable compound (a) having amino and vinyl groups by reacting with the reactive functional group ($Q_2$) in the vinyl-containing compound (a3) described below but is preferably a primary or secondary amino group, a hydroxyl group, or a carboxy group. Among these, a primary or a secondary amino group is particularly preferable due to its high chemical reactivity and diversity of reaction.

The molecular weight of the dendrimer is preferably 300 or more and particularly preferably 1000 to 100,000. When the organic polymer porous material of the present invention is used as a catalyst, a molecular weight of 300 or less is disadvantageous in terms of use of space inside the dendrimer.

The polyethyleneimine (a2) used for preparation of the organic polymer porous material of the present invention may be straight-chain or branched. Commercially available reagents may be used as the polyethyleneimine (a2). Depending on the purposes, a commercially available polyethyleneimine (a2) having a terminal group converted may be used or a polyethyleneimine (a2) may be synthesized and used. The technique of synthesizing the polyethyleneimine (a2) is not particularly limited. For example, the polyethyleneimine (a2) can be obtained by hydrolysis of a polymer having an amide bond in the repeating unit obtained by cationic polymerization of an oxazoline.

The reactive functional group ($Q_1$) of the polyethyleneimine (a2) is preferably bonded to a terminus. The reactive functional group ($Q_1$) is not particularly limited as long as it can give a polymerizable compound (a) having amino and vinyl groups by reacting with the reactive functional group ($Q_2$) in the vinyl-containing compound (a3) described below but is preferably a primary or secondary amino group, a hydroxyl group, or a carboxy group. Among these, a primary or secondary amino group is particularly preferable due to its high chemical reactivity and diversity of reaction.

A straight-chain polyethyleneimine (a2) has a secondary amino group in the molecular chain and a primary amino group at a terminus. A branched polyethyleneimine (a2) has a secondary amino group and a tertiary amino group in the molecular chain and a primary amino group at a terminus. The reactive functional group ($Q_1$) of the polyethyleneimine (a2) may be a primary or secondary amino group originally included in the polyethyleneimine (a2) or may be a reactive functional group separately introduced in the molecular chain.

The weight-average molecular weight of the polyethyleneimine (a2) is preferably 200 or more and particularly preferably 1000 to 100,000. When the organic polymer porous material of the present invention is used as a catalyst, a weight-average molecular weight less than 200 is disadvantageous for carrying out catalytic reactions since the space formed by the polyethyleneimine (a2) in the polymer is diminished.

The compound (a3) having a vinyl group and a reactive functional group ($Q_2$) that can react with the reactive functional group ($Q_1$) of the tertiary amino-containing dendrimer (a1) or the polyethyleneimine (a2) may be any compound, such as a radically, anionically, or cationically polymerizable compound, as long as it gives the polymerizable compound (a) having amino and vinyl groups by reacting with the dendrimer (a1) or the polyethyleneimine (a2). Among these, a radically polymerizable compound is preferably used and the polymerizable group is preferably selected from a (meth) acryloxy group and a styryl group.

Examples of the compound (a3) having a vinyl group and a reactive functional group ($Q_2$) used in the present invention include a compound (a3) having a vinyl group and an isocyanate group, an epoxy group, a primary or secondary amino group, a hydroxyl group, a carboxy group, or a carboxylic acid chloride unit. In particular, a compound (a3) having an isocyanate group and a vinyl group is preferred since a urea bond can be formed by reacting with a dendrimer (a1) or polyethyleneimine (a2) having a primary or secondary amino group as the reactive functional group ($Q_1$). A urea bond acting as a hydrogen-bonding proton donor can enhance the reactivity as a co-catalyst in nucleophilic addition reaction of aldehydes or ketones.

Examples of such a compound (a3) include isocyanate-containing compounds such as 2-(meth)acryloyloxyethyl isocyanate, 2-(2-(meth)acryloyloxyethyloxy)ethyl isocyanate, 1,1-bis((meth)acryloyloxymethyl)ethyl isocyanate, and 4'-vinylphenyl isocyanate, epoxy-containing compounds such as glycidyl (meth)acrylate, amino-containing compounds such as 3-aminopropyl (meth) acrylamide, 2-aminoethyl (meth)acrylate, and 4-vinylaniline, a hydroxyl-containing compounds such as 2-hydroxyethyl (meth)acrylate, 2-hydroxypropyl (meth)acrylate, and 4-vinylphenol, carboxy-containing compounds such as 2-(meth)acryloyloxyethyl succinic acid, (meth)acrylic acid, and 4-vinyl benzoic acid, and acid chlorides such as (meth)acryl acid chlorides and 4-vinyl benzoic acid chlorides. These (meth)acrylates may be used alone or in combination of two or more.

The reaction between the compound (a3) and the dendrimer (a1) or polyethyleneimine (a2) may be carried out by dissolving both compounds used for the reaction in a solvent to bring the compounds to mix with and contact each other, for example. If needed, a catalyst may be used. When the reaction is carried out without any catalyst, the reaction product may be directly used for the subsequent preparation of the organic polymer porous material without isolating it from the solvent. When the reaction is carried out in the presence of a catalyst, the reaction product is purified and isolated and then used for preparation of the organic polymer porous material.

In the aforementioned reaction, when the resulting polymerizable compound (a) has amino and vinyl groups, the reactive functional group ($Q_1$) contained in the dendrimer (a1) or polyethyleneimine (a2) and the reactive functional group ($Q_2$) contained in the vinyl-containing compound (a3) can be fed into the reaction solution. However, when the organic polymer porous material is used as a catalyst in a nucleophilic addition reaction of aldehydes or ketones, the effect is diminished when the number of amino groups acting as bases is small. Thus, the number of amino groups in one molecule of the polymerizable compound (a) is preferably 2 or more, more preferably 4 or more, and most preferably 8 or more. When many vinyl groups are in one molecule of the polymerizable compound (a), the amount of the comonomers added to the polymerizable composition (A) can be reduced, and thus the relative amino group content in the organic polymer porous material can be increased. Accordingly, the number of vinyl groups in one molecule of the polymerizable compound (a) is preferably 2 or more, more preferably 4 or more, and most preferably 6 or more.

As discussed above, when a compound (a3) having an isocyanate group and a vinyl group is reacted with the dendrimer (a1) or polyethyleneimine (a2) having a primary or secondary amino group as the reactive functional group ($Q_1$), a urea bond which can act as a co-catalyst can be generated by the reaction. In such a case, the relative ratio of the primary or secondary amino groups contained in the dendrimer (a1) or polyethyleneimine (a2) to the isocyanate groups contained in the vinyl-containing compound (a3) is preferably in the range of 1:1/8 to 1:1 and more preferably 1:1/4 to 1:1/2.

The amino group content in the organic polymer porous material is preferably in the range of 0.010 mmol/g to 9.00 mmol/g and more preferably in the range of 0.10 mmol/g to 9.00 mmol/g. The amino groups in the polymer ($P_A$) may be any of primary, secondary, and tertiary amino groups.

The organic polymer porous material of the present invention may contain metal nanoparticles by complexing with the polymer ($P_A$). The metal nanoparticles are preferably particles composed of at least one element selected from the group consisting of a first-row transition element, a second-row transition element, a third-row transition element, and a fourth-row transition element. In particular, particles composed of at least one element selected from the group consisting of a second-row transition element and a third-row transition element are preferred, and particles composed of at least one element selected from the group consisting of palladium, platinum, ruthenium, rhodium, gold, silver, and rhenium are particularly preferable. The metal content in the organic polymer porous material is preferably in the range of 0.01 mmol/g to 5.00 mmol/g and more preferably in the range of 0.05 mmol/g to 5.00 mmol/g. The average size of the metal nanoparticles is preferably in the range of 0.1 to 100 nm and more preferably in the range of 0.5 to 10 nm.

The organic polymer porous material takes a form of aggregated particles, a network or porous structure, or the like and preferably has an average pore size in the range of 0.001 to 10 μm. A gradient structure in which the structure changes in the depth direction can also be formed. In many application fields, a gradient structure in which the pore size is large at the surface and decreases with the depth is preferable. The organic polymer porous material of the present invention preferably has a specific surface area in the range of 5 to 2000 $m^2/g$, and when the organic polymer porous material is used in catalytic reactions, the specific surface area is more preferably in the range of 50 to 2000 $m^2/g$.

The organic polymer porous material of the present invention may take a form of a membrane. In such a case, the thickness of the organic polymer porous material is preferably in the range of 1 to 100 μm and more preferably in the range of 3 to 50 μm. When an organic polymer porous material having a thickness less than 1 μm is used as a catalyst, the performance tends to deteriorate and thus this is not preferred. The thickness of the organic polymer porous material can be measured by microscopically observing a cross-section with a scanning electron microscope.

[Method for Producing Organic Polymer Porous Material]

The organic polymer porous material of the present invention can be produced by polymerizing an organic polymer porous material-forming composition (X), i.e., a mixture of a polymerizable composition (A) containing a polymerizable compound (a) having amino and vinyl groups and a solvent (M) that is compatible with the polymerizable composition (A) but does not dissolve or swell the polymer ($P_A$) of the polymerizable composition (A), and then removing the solvent (M) (step ($\alpha$-1)).

According to this method, the polymer ($P_A$) prepared by polymerizing the polymerizable composition (A) is not compatible with the solvent (M), phase separation occurs between the polymer ($P_A$) and the solvent (M), and the solvent (M) is trapped in the polymer ($P_A$) or between the molecules of the polymer ($P_A$). When the solvent (M) is removed, regions which had been occupied by the solvent (M) form pores and an organic polymer porous material can thereby be formed.

The polymerizable composition (A) is constituted by either the polymerizable compound (a) containing amino and vinyl groups alone or the polymerizable compound (a) and another polymerizable compound that can form a copolymer with the polymerizable compound (a). The polymerizable compound (a) used may be a single compound or a mixture of two or more compounds.

The polymerizable compound that can form a copolymer with the polymerizable compound (a) is preferably a compound that can be polymerized in the presence or absence of a polymerization initiator and that has a vinyl group. In particular, (meth)acrylic compounds and styryl compounds having high reactivity are preferred. A compound that forms a cross-linking polymer by polymerization is preferable since the strength after curing can be increased. From this viewpoint, a compound having two or more vinyl groups in a molecule is particularly preferable.

Examples of the (meth)acrylic compounds include difunctional monomers such as ethylene glycol di(meth)acrylate, diethylene glycol di(meth)acrylate, neopentyl glycol di(meth)acrylate, 1,6-hexanediol di(meth)acrylate, 2,2'-bis(4-(meth)acryloyloxypolyethyleneoxyphenyl)propane, 2,2'-bis(4-(meth)acryloyloxypolypropyleneoxyphenyl)propane, neopentyl glycol di(meth)acrylate hydroxy dipivalate, dicyclopentanyl diacrylate, bis(acryloxyethyl)hydroxyethyl isocyanurate, and N-methylenebisacrylamide; trifunctional monomers such as trimethylolpropane tri(meth)acrylate, trimethylolethane tri(meth)acrylate, tris(acryloxyethyl) isocyanurate, and caprolactone-modified tris(acryloxyethyl) isocyanurate; tetrafunctional monomers such as pentaerythritol tetra(meth)acrylate; and hexafunctional monomers such as dipentaerythritol hexa(meth)acrylate.

The examples of the polymerizable oligomers having (meth)acryloyl in the molecular chain include those having a weight-average molecular weight of 500 to 50,000, for example, (meth)acrylic acid esters of epoxy resins, (meth)acrylic acid esters of polyether resins, (meth)acrylic acid esters of polybutadiene resins, and polyurethane resins having terminal (meth)acryloyl groups.

Examples of the styryl compound include 1,3-divinylbenzene and 1,3-dipropenylbenzene.

These polymerizable compounds may be used alone or as a mixture of two or more. A polymerizable compound having one vinyl group, in particular, a (meth)acryl compound or styryl compound having one vinyl group may be mixed and used to adjust the viscosity.

Examples of the (meth)acryl compound having one vinyl group include methyl (meth)acrylate, alkyl (meth)acrylate, isobornyl (meth)acrylate, alkoxy polyethylene glycol (meth) acrylate, phenoxy dialkyl (meth)acrylate, phenoxy polyethylene glycol (meth)acrylate, alkyl phenoxy polyethylene glycol (meth)acrylate, nonyl phenoxy polypropylene glycol (meth)acrylate, hydroxy alkyl (meth)acrylate, glycerol acrylate methacrylate, butanediol mono(meth)acrylate, 2-hydroxy-3-phenoxypropyl acrylate, 2-acryloyloxy ethyl-2-hydroxypropyl acrylate, ethylene oxide-modified phthalic acid acrylate, w-carboxycaprolactone monoacrylate, 2-acryloyloxypropylhydrogen phthalate, 2-acryloyloxyethyl succinic acid, acrylic acid dimer, 2-acryloyloxypropylhexahydrohydrogen phthalate, fluorine-substituted alkyl (meth)acrylate, chlorine-substituted alkyl (meth)acrylate, sulfonic acid soda ethoxy (meth)acrylate, sulfonic acid-2-methylpropane-2-acrylamide, phosphate-containing (meth)acrylate, glycidyl (meth)acrylate, 2-isocyanatoethyl (meth)acrylate, (meth) acryloyl chloride, (meth)acrylaldehyde, sulfonate-containing (meth)acrylate, silano-containing (meth)acrylate, ((di)alkyl) amino-containing (meth)acrylate, quaternary ((di)alkyl)ammonium-containing (meth)acrylate, (N-alkyl) acrylamide, (N,N-dialkyl)acrylamide, and acryloyl morpholine.

Examples of the styryl compound having one vinyl group include styrene, propenylbenzene, 1-vinylnaphthalene, and 9-vinylanthracene.

A solvent that is compatible with the polymerizable composition (A) but does not dissolve or swell the polymer ($P_A$) obtained from the polymerizable composition (A) is used as the solvent (M). The degree of compatibility between the solvent (M) and the polymerizable composition (A) may be any degree at which a homogeneous organic polymer porous material-forming composition (X) can be obtained. The solvent (M) may be a single solvent or a mixed solvent. When the solvent is a mixed solvent, the constitutional components may be those which are incompatible with the polymerizable composition (A) when used alone or may be those which dissolve the polymer ($P_A$) obtained from the polymerizable composition (A) when used alone. Examples of the solvent (M) include alkyl esters of fatty acids such as ethyl acetate, methyl decanoate, methyl laurate, and diisobutyl adipate, ketone such as acetone, 2-butanone, isobutyl methyl ketone, and diisobutyl ketone, ethers such as diethyl ether, tetrahydrofuran, 1,4-dioxane, ethylene glycol dimethyl ether, diethylene glycol dimethyl ether, and triethylene glycol dimethyl ether, aprotic polar solvents such as N,N-dimethylformamide, N,N-dimethylacetamide, dimethyl sulfoxide, and N-methylpyrrolidone; aromatic hydrocarbons such as benzene and toluene, aliphatic hydrocarbons such as hexane and octane, halogenated hydrocarbons such as dichloromethane, chloroform, and carbon tetrachloride, alcohols such as methanol, ethanol, 2-propanol, 1-butanol, 1,1-dimethyl-1-ethanol, hexanol, and decanol, and water. Among these solvents, when used as a single solvent, aprotic polar solvents such as N,N-dimethylformamide, N,N-dimethylacetamide, dimethyl sulfoxide, and N-methylpyrrolidone and high-polarity alcohols such as methanol, ethanol, 2-propanol, 1,1-dimethyl-1-ethanol are preferred since they are highly compatible with the polymerizable composition (A) that contains the polymerizable compound (a). A mixed solvent containing a high polarity solvent such as acetone, N,N-dimethylformamide, N,N-dimethylacetamide, methanol, ethanol, or 2-propanol and a medium polarity solvent compatible therewith such as tetrahydrofuran, 1,4-dioxane, or diethylene glycol dimethyl ether is also preferable to control the specific surface area of the organic polymer porous material obtained.

No limit is imposed on the method for removing the solvent (M) after polymerization of the organic polymer porous material-forming composition (X), and drying may be conducted at a normal pressure or a reduced pressure when the solvent (M) has high volatility. When the solvent (M) has low volatility, the product obtained by the polymerization of the composition (X) may be brought into contact with a solvent having high volatility to conduct solvent exchange and then drying may be conducted at a normal pressure or a reduced pressure. It is also effective that, in removing the solvent (M), in order to remove unreacted remaining components among the polymerizable compound (a) and other polymerizable compound contained in the polymerizable composition (A), a solvent that dissolves these compounds may be used to conduct washing and extraction. A Soxhlet extractor may be used for extraction operation.

The pore size and the strength of the obtained organic polymer porous material change depending on the amount of the polymerizable composition (A) contained in the organic polymer porous material-forming composition (X). Although the strength of the organic polymer porous material improves with the increase in the amount of the polymerizable composition (A), the pore diameter shows a decreasing tendency. The amount of the polymerizable composition (A) is preferably in the range of 15 to 50 mass % and more preferably in the range of 25 to 40 mass %. When the amount of the polymerizable composition (A) is below 15 mass %, the strength of the organic polymer porous material is lowered. When the amount of the polymerizable composition (A) is over 50 mass %, it becomes difficult to control the pore size of the porous material.

Various additives such as a polymerization initiator, a polymerization inhibitor, a polymerization retarder, and a soluble polymer may be added to the organic polymer porous material-forming composition (X) in order to adjust the polymerization rate, degree of polymerization, pore size distribution, etc.

The polymerization initiator is not particularly limited as long as it helps start polymerization of the polymerizable composition (A) and a radical polymerization initiator, an anionic initiator, a cationic initiator, and the like can be used. Examples thereof include azo initiators such as 2,2'-azobisbutyronitrile, 2,2'-azobiscyclohexanecarbonitrile, 1,1'-azobis (cyclohexane-1-carbonitrile), 2,2'-azobis(2-methylbutyronitrile), 2,2'-azobis(2,4-dimethylvaleronitrile), 2,2'-azobis(4-methoxy-2,4-dimethylvaloeronitrile), 4,4'-azobis(4- cyanovaleic acid), dimethyl 2,2'-azobisisolactate, 2,2'-azobis (2-methylpropionamidoxime), 2,2'-azobis(2-(2-imidazolin-2-yl)propane), and 2,2'-azobis(2,4,4-trimethylpentane), and peroxide initiators such as benzoyl peroxide, di-t-butyl peroxide, t-butyl hydroperoxide, and cumene hydroperoxide. Examples of the polymerization initiator that functions by active energy rays include acetophenones such as p-tert-butyltrichloroacetophenone, 2,2'-diethoxyacetophenone, and 2-hydroxy-2-methyl-1-phenylpropan-1-one, ketones such as benzophenone, 4,4'-bisdimethylaminobenzophenone, 2-chlorothioxanthone, 2-methylthioxanthone, 2-ethylthioxanthone, and 2-isopropylthioxanthone, benzoin ethers such as benzoin, benzoin methyl ether, benzoin isopropyl ether, and benzoin isobutyl ether, benzyl ketals such as benzyl dimethyl ketal and hydroxycyclohexyl phenyl ketone, and azides such as N-azidosulfonylphenyl maleimide. A polymerizable photopolymerization initiator such as a maleimide compound may also be used. A disulfide initiator such as tetraethyl thiuram disulfide, a nitroxide initiator such as 2,2,6,6-tetramethylpiperidin-1-oxyl, and a living radical polymerization initiator such as 4,4'-di-t-butyl-2,2'-bipyridine copper complex-methyl trichloroacetate complex may also be used.

The polymerization retarder and the polymerization inhibitor can be used mainly in polymerization using active energy rays. Examples thereof include vinyl monomers having a low polymerization rate such as α-methylstyrene and 2,4-diphenyl-4-methyl-1-pentene, and hindered phenols such as tert-butylphenol.

The soluble polymer may be any as long as it gives a homogeneous organic polymer porous material-forming composition (X) and is soluble in the solvent (M) alone. Since the soluble polymer is soluble in the solvent (M), it can be easily removed from a polymerized product during removal of the solvent (M) from the polymer obtained by polymerization of the composition (X).

The polymerization reaction may be conducted by a commonly employed technique, such as thermal polymerization and active energy ray polymerization involving radiation with ultraviolet rays and electron beams. For example, the organic polymer porous material can be produced by using the thermal polymerization initiator described above and conducting reactions at 40 to 100° C. and preferably 60 to 80° C. for 10 minutes to 72 hours and preferably 6 to 24 hours. Alternatively, the organic polymer porous material can be produced by using any of various mercury lamps and metal halide lamps and conducting reactions at an output of 250 to 3000 W at room temperature for 1 second to 2 hours and preferably 10 seconds to 30 minutes.

When the organic polymer porous material is in the form of a membrane, a surfactant, a thickener, a modifier, a catalyst, etc., that are commonly employed may be added to improve the coatability and smoothness.

The support that can be used in producing the organic polymer porous material in the membrane form may be any support that is left substantially intact, for example, undissolved or undecomposed, by the organic polymer porous material-forming composition (X) and does not substantially invade the organic polymer porous material-forming composition (X). Examples of such a support include resins, crystals such as glass and quartz, ceramics, semiconductors such as silicon, and metals. Of these, resin and glass are favored since they are highly transparent and inexpensive. The resin used for the support may be a homopolymer or a copolymer and may be a thermoplastic polymer or a thermosetting polymer. The support may be composed of a polymer blend or a polymer alloy and may be a composite such as a laminate. The support may contain additives such as a modifier, a colorant, a filler, a reinforcing material, and the like.

The shape of the support is not particularly limited and any shape that suits the purpose of use may be used. Examples of the shape include sheet shapes (including film, ribbon, and belt shapes), plate shapes, roll shapes, and spherical shapes; however, from the viewpoint of ease of applying the organic polymer porous material-forming composition (X) thereon, the surface to be coated is preferably a flat surface of a quadric surface.

The support may be surface-treated when it is composed of a resin or any material other than resins. Examples of the surface treatment include treatment for preventing dissolution of the support by the organic polymer porous material-forming composition (X) and treatment for improving the wettability of the organic polymer porous material-forming composition (X) and adhesiveness of the organic polymer porous material.

The technique of surface-treating the support may be any. Examples of the surface treatment technique include coating the surface of a support with a desired polymerizable composition (A) followed by curing through polymerization reactions, a corona treatment, a plasma treatment, a flame treatment, an acid or alkali treatment, a sulfonation treatment, a fluorination treatment, a primer treatment with a silane coupling agent or the like, a surface graft polymerization, application of a surfactant, a releasing agent, or the like, and a physical treatment such as rubbing and sand blasting. Another example of the technique is a method of reacting a compound which can be immobilized on the surface by reacting with the reactive functional group of the material of the organic polymer porous material or the reactive functional group introduced through the surface treatment technique described above. When glass or quartz is used as the support, the technique of treating with a silane coupling agent such as trimethoxysilylpropyl (meth)acrylate or triethoxysilylpropyl (meth)acrylate is useful for improving the adhesiveness of the organic polymer porous material to the support since the polymerizable group contained in the silane coupling agent can be co-polymerized with the organic polymer porous material-forming composition (X).

The method for coating the support with the organic polymer porous material-forming composition (X) may be any known method and may be, for example, a method that uses a coater or spraying.

According to the method for producing the organic polymer porous material described here, an aggregated granule-structure polymer porous material in which polymer granules about 0.1 μm to 1 μm in diameter are aggregated and gaps between the granules serve as pores or a three dimensional network-structure polymer porous material in which polymers are aggregated to form a network can be formed.

The method for producing the organic polymer porous material that can be used in the present invention is not limited to the above-described examples of the method for producing the organic polymer porous material.

[Catalytic Reaction Using Organic Polymer Porous Material]

A catalytic reaction using the organic polymer porous material of the present invention will now be described.

The organic polymer porous material of the present invention can be used for a catalytic reaction involving amino groups since the organic polymer porous material contains a polymer ($P_A$) obtained from a polymerizable compound (a) having amino and vinyl groups. In particular, it is preferably used in a catalytic reaction that uses an amino group as a base and more preferably used as a base catalyst in nucleophilic addition reactions of aldehydes and ketones. Examples of the preferable reaction include the Aldol reaction, the Knoevenagel reaction, the Henry (nitroaldol) reaction, and the cyanosilylation reaction.

When the organic polymer porous material is used in catalytic reactions, the reaction raw materials may be dissolved or dispersed in a solvent and the resulting solution or dispersion may be brought into contact with the organic polymer porous material in a heterogeneous system. If needed, a co-catalyst and additives may be used. The solvent used in the reaction can be adequately selected from water, organic solvents, and mixed solvents thereof depending on the type of the reaction.

The organic polymer porous material of the present invention can provide a catalyst having good stability for repeated use. A "catalyst having good stability for repeated use" means that the catalytic performance remains unchanged in a 24-hour catalyst test at 80° C. and that the catalyst can be reused at least 5 times, more preferably, 10 times under the same conditions.

[Method for Producing Organic Polymer Porous Material Containing Metal Nanoparticles]

Following three methods may be carried out to produce an organic polymer porous material containing metal nanoparticles according to the present invention.

A first method includes preparing an organic polymer porous material-forming composition (Y) by mixing a polymerizable composition (A) containing a polymerizable compound (a) having amino and vinyl groups, a metal compound (b), and a solvent (M) that is compatible with the polymerizable composition (A) and the metal compound (b) but does not dissolve or swell a polymer ($P_A$) obtained from the polymerizable composition (A), polymerizing the composition (Y) while reducing the metal compound (b) at the same time to generate metal nanoparticles, and removing the solvent (M) to form an organic polymer porous material (step ($\beta$-1)).

A second method includes performing the step ($\beta$-1) indicated in the first method and a step ($\beta$-2) of bringing the organic polymer porous material obtained in the step ($\beta$-1) into contact with a solution (H) containing a reductant (c) and separating the organic polymer porous material from the solution (H).

A third method includes performing the step ($\alpha$-1) indicated in the section [Method for producing organic polymer porous material], a step ($\beta$-3) of bringing the organic polymer porous material obtained in the step ($\alpha$-1) into contact with a solution (I) containing a metal compound (b) to allow the metal compound (b) to adsorb onto the organic polymer porous material and then separating the organic polymer porous material from the solution (I), and a step ($\beta$-4) of bringing the organic polymer porous material containing the metal compound (b) into contact with a solution (H) containing a reductant (c) to reduce the metal compound (b) to generate metal nanoparticles, and separating the generated organic polymer porous material containing metal nanoparticles from the solution (H).

The first to third methods for producing an organic polymer porous material containing metal nanoparticles will now be described in detail.

According to the first method, the polymer ($P_A$) prepared by polymerizing the polymerizable composition (A) in the composition (Y) become incompatible with the solvent (M), phase separation occurs between the polymer ($P_A$) and the solvent (M), and the solvent (M) is trapped in the polymer ($P_A$) or between the molecules of the polymer ($P_A$). When the solvent (M) is removed, regions which had been occupied by the solvent (M) form pores and an organic polymer porous material containing metal nanoparticles can thereby formed.

The metal compound (b) is preferably a salt of an element selected from a first-row transition element, a second-row transition element, a third-row transition element, and a fourth-row transition element, e.g., iodate, bromate, chlorate, fluorate, nitrate, perchlorate, phosphate, sulfate, sulfite, acetate, acetylacetonate, oxalate, gluconate, p-toluenesulfonate, or the like. In particular, a salt of a second-row transition element or a third-row transition element is preferred, and a salt of palladium, platinum, ruthenium, rhodium, gold, silver, or rhenium is particularly preferable. Chlorates, acetates, and nitrates of these transition metals are preferably used. These transition metal compounds may be used alone or in combination of two or more. According to the organic polymer porous material-forming composition (Y), the amino groups in the polymerizable composition (A) form coordinate bonds with the transition metal in the metal compound (b) and the metal compound (b) can be captured in the polymerizable compound (a).

A solvent that is compatible with the polymerizable composition (A) and the metal compound (b) but does not dissolve or swell the polymer ($P_A$) obtained from the polymerizable composition (A) is used as the solvent (M) from among the solvents described in the section [Method for producing organic polymer porous material]. The degree of compatibility between the solvent (M) and the polymerizable composition (A) and the metal compound (b) may be a degree at which a homogeneous composition (Y) can be obtained. The solvent (M) may be a single solvent or a mixed solvent. When the solvent is a mixed solvent, the constitutional components may be those which are incompatible with the polymerizable composition (A) or the metal compound (b) when used alone or may be those which dissolve the polymer ($P_A$) obtained from the polymerizable composition (A) when used alone.

Various additives such as a polymerization initiator, a polymerization inhibitor, a polymerization retarder, and a soluble polymer may be added to the organic polymer porous material-forming composition (Y) in order to adjust the polymerization rate, degree of polymerization, pore size distribution, etc. The compounds indicated in the section [Method for producing organic polymer porous material] can be used as the polymerization initiator, polymerization inhibitor, polymerization retarder, and soluble polymer.

The polymerization reaction may be conducted by a commonly employed technique, such as thermal polymerization, and active energy ray polymerization involving radiation with ultraviolet rays and electron beams.

According to the first method for producing the organic polymer porous material containing metal nanoparticles, the metal compound (b) is reduced and metal nanoparticles are generated at the same time during polymerization of the polymerizable composition (A) (step ($\beta$-1). The metal compound (b) is reduced by the reducing effect of the radical at the propagating polymer chain terminus that occurs during the polymerization reaction of the polymerizable composition (A) and converted into metal nanoparticles. This method is favored since formation of the metal nanoparticles having crystal phases with good catalytic properties is easy. The metal is in some cases reduced by the reducing effect of amino groups contained in the polymerizable composition (a). In the case of active energy ray polymerization, the benzylketal polymerization initiator described above is favored since a ketyl radical generated by irradiation with active energy rays has a reducing effect on the metal compound (b).

According to the second method for producing the organic polymer porous material containing metal nanoparticles, the step ($\beta$-1) indicated in the first method is performed and then the step ($\beta$-2) of bringing the organic polymer porous material into contact with the solution (H) containing the reductant (c) and then separating the organic polymer porous material from the solution (H) is performed. All of the remaining metal compound (b) after performance of the first method can be reduced and generation of metal nanoparticles can be accelerated by conducting this step.

Known reductants such as hydride reductants, e.g., sodium borohydride and potassium borohydride, hydrazine, and ascorbic acid, can be used as the reductant (c). The solvent used for preparation of the solution (H) may be any solvent that can dissolve the reductant used and that does not react with the polymer. Examples thereof include alkyl esters such as ethyl acetate, ketones such as acetone, 2-butanone, and isobutyl methyl ketone, ethers such as diethyl ether, tetrahydrofuran, and 1,4-dioxane, aprotic polar solvents such as N,N-dimethylformamide and N,N-dimethylacetamide, alcohols such as methanol, ethanol, and 2-propanol, and water. For example, the organic polymer porous material can be produced by conducting reduction reactions at 0 to 80° C. and preferably room temperature to 40° C. for 1 second to 24 hours and preferably 10 seconds to 6 hours.

According to the third method for producing the organic polymer porous material containing metal nanoparticles, the step (α-1) indicated in the section [Method for producing organic polymer porous material] is performed and then the step (β-3) of bringing the organic polymer porous material obtained in the step (α-1) into contact with the solution (I) containing the metal compound (b) to allow the metal compound (b) to adsorb onto the organic polymer porous material and then separating the organic polymer porous material from the solution (I) are performed. The solvent used for preparation of the solution (I) may be any solvent that can dissolve the metal compound (b) used and that does not react with the polymer. Examples thereof include alkyl esters such as ethyl acetate, ketones such as acetone, 2-butanone, and isobutyl methyl ketone, ethers such as diethyl ether, tetrahydrofuran, and 1,4-dioxane, aprotic polar solvents such as N,N-dimethylformamide and N,N-dimethylacetamide, alcohols such as methanol, ethanol, and 2-propanol, and water.

The step (β-4) is a step of bringing the organic polymer porous material onto which the metal compound is adsorbed into contact with the solution (H) containing the reductant (c) and then separating the organic polymer porous material from the solution (H).

The method for producing the organic polymer porous material containing the metal nanoparticles that can be used in the present invention is not limited to the above-described examples of the method for producing the organic polymer porous material.

[Catalytic Reaction Using Organic Polymer Porous Material Containing Metal Nanoparticles]

A catalytic reaction using organic polymer porous material containing metal nanoparticles according to the present invention will now be described.

The organic polymer porous material containing metal nanoparticles according to the present invention can be used in catalytic reactions involving metal nanoparticles in general. In particular, the organic polymer porous material containing metal nanoparticles is preferably used in catalytic reactions that use nanoparticles of palladium, platinum, ruthenium, rhodium, gold, silver, or rhenium and more preferably in catalytic reactions that use nanoparticles of palladium, platinum, or gold. Examples of the type of the catalytic reaction include coupling reactions of aryls and hydrogenation reactions. Of these, coupling reactions of halogenated aryls are preferred and examples thereof include Susuki-Miyaura reaction, Sonogashira reaction, Heck reaction, and Stille reaction. Other examples of the preferable reaction include allylic site transfer reaction.

When the organic polymer porous material containing metal nanoparticles is used in catalytic reactions, the reaction raw materials may be dissolved or dispersed in a solvent and the resulting solution or dispersion may be brought into contact with the organic polymer porous material containing metal nanoparticles in a heterogeneous system. If needed, a co-catalyst and additives may be used. The solvent used in the reaction can be adequately selected from water, organic solvents, and mixed solvents thereof depending on the type of the reaction.

The organic polymer porous material containing the metal nanoparticles of the present invention can provide a catalyst having good stability for repeated use. A "catalyst having good stability for repeated use" means that the catalytic performance remains unchanged in a 24-hour catalyst test at 80° C. and that the catalyst can be reused at least 5 times, more preferably, 10 times under the same conditions.

EXAMPLES

The present invention will now be described in further detail by using Examples below which do not limit the scope of the present invention.

Example 1

[Synthesis of Polymerizable Compound (a)]

To 570 mg (4.0 μmol, terminal primary amine equivalent: $2.60 \times 10^2$ μmol) of generation 4 (G4) polyamidoamine (PAMAM) dendrimer (10 mass % methanol solution, product of Sigma-Aldrich, molecular weight: 14214.4, product code: 412449) containing primary amino as a reactive functional group, 40 mg ($2.56 \times 10^2$ μmol) of 2-isocyanatoethyl methacrylate (product of Showa Denko K.K., product name: KarenzMOI) was added and the mixture was stirred at room temperature for 1 day using a magnetic stirrer. Then the solvent was distilled away to obtain a target polymerizable compound [a-1]. The polymerizable compound [a-1] contained 62 tertiary amino groups and 64 vinyl groups in a molecule.

$^1$H-NMR (300 MHz, CD$_3$OD): δ/ppm 1.92, 2.35-2.37, 2.57-2.59, 2.78-2.80, 3.25-3.35, 3.42, 4.16, 5.63 (vinyl), 6.11 (vinyl).

[Preparation of Organic Polymer Porous Material]

An organic polymer porous material-forming composition [X-1] was prepared by mixing 97 mg of polymerizable compound [a-1], 870 mg of ethylene glycol dimethacrylate (product of KYOEISHA CHEMICAL Co., Ltd., product name: LIGHT-ESTER EG) (hereinafter referred to as "EGDMA"), 13 mg of azobisisobutyronitrile (hereinafter referred to as "AIBN") as a polymerization initiator, 4.0 mL of diethylene glycol dimethyl ether (hereinafter referred to as "diglyme"), and 1.0 mL of methanol.

Next, the composition [X-1] was placed in a polymerization tube, nitrogen gas was injected thereto for 30 minutes, and the tube was sealed and heat-treated at 70° C. for 12 hours. A white solid formed was discharged from the polymerization tube, and a Soxhlet extractor (solvent: tetrahydrofuran and methanol) was used to remove the unpolymerized components and the solvent to prepare an organic polymer porous material [P-1].

Yield: 950 mg, yield ratio: 97%.

Amino group content: 0.25 mmol/g (tertiary amino groups).

Specific surface area (BET simple method): 450 m$^2$/g.

Measuring instrument: Micromeritics FlowSorb II (Shimadzu Corporation)

Sample amount: about 0.01 to 0.03 g

Pretreatment: heating at 100° C. for 30 minutes in a carrier gas (N$_2$/He mixed gas)

Observation mode: Scanning electron microscopic image is shown in FIG. 1.

Instrument: Real Surface View Microscope (Keyence)

[Catalytic Reaction Test Using Organic Polymer Porous Material]

A reaction solution (Y1) was prepared by homogeneously mixing 0.72 mmol of malononitrile, 0.60 mmol of benzaldehyde, and 2 mL of toluene. Thereto, 20 mg (amine equivalent: 5.06 μmol) of the organic polymer porous material [P-1] described above was added and the reaction was conducted at room temperature for 3 hours. Analysis by gas chromatography confirmed that the reaction ratio was 98% or more and generation of the target product, benzalmalononitrile.

The organic polymer porous material [P-1] filtered out from the reaction solution was washed with ethanol and toluene and dried. The same catalytic reaction test as one described above was repeated 5 times. It was confirmed that the reaction ratio did not decrease and the target product was obtained.

Example 2

[Synthesis of Polymerizable Compound (a)]

A polymerizable compound [a-1] was obtained as in Example 1.

[Preparation of Organic Polymer Porous Material]

An organic polymer porous material-forming composition [X-2] was prepared by mixing 194 mg of the polymerizable compound [a-1], 6 mg of AIBN, 1.6 mL of diglyme, and 1.1 mL of methanol.

Next, the composition [X-2] was placed in a polymerization tube, nitrogen gas was injected thereto for 30 minutes, and the tube was sealed and heat-treated at 70° C. for 12 hours. A white solid formed was discharged from the polymerization tube, and a Soxhlet extractor (solvent: tetrahydrofuran and methanol) was used to remove the unpolymerized components and the solvent to prepare an organic polymer porous material [P-2].

Yield: 190 mg, yield ratio: 95%.

Amino group content: 2.5 mmol/g (tertiary amino groups).

Specific surface area (BET simple method): 224 $m^2$/g.

The measuring instruments, the sample amount, and the pretreatment were the same as those in Example 1.

[Catalytic Reaction Test Using Organic Polymer Porous Material]

As in Example 1, to the reaction solution (Y1), 15 mg (amine equivalent: 37.4 μmol) of the organic polymer porous material [P-2] was added, and the reaction was conducted at room temperature for 3 hours. Analysis by gas chromatography confirmed that the reaction ratio was 98% or more and generation of the target product, benzalmalononitrile.

The organic polymer porous material [P-2] filtered out from the reaction solution was washed with ethanol and toluene and dried. The same catalytic reaction test as one described above was repeated 5 times. It was confirmed that the reaction ratio did not decrease and the target product was obtained.

Example 3

[Synthesis of Polymerizable Compound (a)]

A polymerizable compound [a-2] was obtained as in Example 1 except that 10 mg (64.4 μmol) of 2-isocyanatoethyl methacrylate was used instead of 40 mg (2.56×$10^2$ μmol). The polymerizable compound [a-2] contained 62 tertiary amino groups, 48 primary amino groups, and 16 vinyl groups in a molecule.

$^1$H-NMR (300 MHz, $CD_3OD$): δ/ppm 1.91-1.95, 2.35-2.37, 2.57-2.59, 2.78-2.80, 3.25-3.35, 3.42, 4.16, 5.62-5.66 (vinyl), 6.01-6.14 (vinyl).

[Preparation of Organic Polymer Porous Material]

An organic polymer porous material-forming composition [X-3] was prepared by mixing 134 mg of the polymerizable compound [a-2], 1.21 g of EGDMA, 18 mg of AIBN, 5.5 mL of diglyme, and 1.3 mL of methanol.

Next, the composition [X-3] was placed in a polymerization tube, nitrogen gas was injected thereto for 30 minutes, and the tube was sealed and heat-treated at 70° C. for 12 hours. A white solid formed was discharged from the polymerization tube, and a Soxhlet extractor (solvent: tetrahydrofuran and methanol) was used to remove the unpolymerized components and the solvent to prepare an organic polymer porous material [P-3].

Yield: 1.30 g, yield ratio: 96%.

Amino group content: 0.37 mmol/g (tertiary amino groups), 0.28 mmol/g (primary amino groups).

Specific surface area (BET simple method): 339 $m^2$/g.

The measuring instruments, the sample amount, and the pretreatment were the same as those in Example 1.

[Catalytic Reaction Test Using Organic Polymer Porous Material]

As in Example 1, to the reaction solution (Y1), 20 mg (amine equivalent: 5.66 μmol) of the organic polymer porous material [P-3] was added, and the reaction was conducted at room temperature for 3 hours. Analysis by gas chromatography confirmed that the target product, benzalmalononitrile was obtained at a reaction ratio of 98% or more.

The organic polymer porous material [P-3] filtered out from the reaction solution was washed with ethanol and toluene and dried. The same catalytic reaction test as one described above was repeated 5 times. It was confirmed that the reaction ratio did not decrease and the target product was obtained.

Example 4

[Synthesis of Polymerizable Compound (a)]

A polymerizable compound [a-3] was obtained as in Example 1 except that 5.0 mg (32.2 μmol) of 2-isocyanatoethyl methacrylate was used instead of 40 mg (2.56×$10^2$ μmol). The polymerizable compound [a-3] contained 62 tertiary amino groups, 56 primary amino groups, and 8 vinyl groups in a molecule.

$^1$H-NMR (300 MHz, $CD_3OD$): δ/ppm 1.91-1.95, 2.35-2.39, 2.58-2.60, 2.70-2.81, 3.23-3.35, 3.42, 3.55-3.60, 4.16, 5.62-5.65 (vinyl), 6.07-6.11 (vinyl).

[Preparation of Organic Polymer Porous Material]

An organic polymer porous material-forming composition [X-4] was prepared by mixing 124 mg of the polymerizable compound [a-3], 1.12 g of EGDMA, 17 mg of AIBN, 5.1 mL of diglyme, and 1.3 mL of methanol.

Next, the composition [X-4] was placed in a polymerization tube, nitrogen gas was injected thereto for 30 minutes, and the tube was sealed and heat-treated at 70° C. for 12 hours. A white solid formed was discharged from the polymerization tube, and a Soxhlet extractor (solvent: tetrahydrofuran and methanol) was used to remove the unpolymerized components and the solvent to prepare an organic polymer porous material [P-4].

Yield: 1.21 g, yield ratio: 96%.

Amino group content: 0.39 mmol/g (tertiary amino groups), 0.36 mmol/g (primary amino groups).

Specific surface area (BET simple method): 377 $m^2$/g.

The measuring instruments, the sample amount, and the pretreatment were the same as those in Example 1.
[Catalytic Reaction Test Using Organic Polymer Porous Material]

As in Example 1, to the reaction solution (Y1), 20 mg (amine equivalent: 7.12 µmol) of the organic polymer porous material [P-4] was added, and the reaction was conducted at room temperature for 3 hours. Analysis by gas chromatography confirmed that the target product, benzalmalononitrile was generated at a reaction ratio of 98% or more.

The organic polymer porous material [P-4] filtered out from the reaction solution was washed with ethanol and toluene and dried. The same catalytic reaction test as one described above was repeated 5 times. It was confirmed that the reaction ratio did not decrease and the target product was obtained.

Example 5

[Synthesis of Polymerizable Compound (a)]

To 570 mg (4.0 µmol, terminal primary amine equivalent: $2.60 \times 10^2$ µmol) of generation 4 (G4) polyamidoamine (PAMAM) dendrimer (10 mass % methanol solution, product of Sigma-Aldrich, molecular weight: 14277.4, product code: 477850) containing hydroxyl as a reactive functional group, 40 mg ($2.56 \times 10^2$ µmol) of 2-isocyanatoethyl methacrylate was added and the mixture was stirred at room temperature for 1 day using a magnetic stirrer. Then the solvent was distilled away to obtain a target polymerizable compound [a-4]. The polymerizable compound [a-4] contained 62 tertiary amino groups and 64 vinyl groups in a molecule.

$^1$H-NMR (300 MHz, $CD_3OD$): δ/ppm 1.93, 2.36-2.40, 2.59-2.61, 2.77-2.81, 3.28-3.41, 3.62, 4.17, 5.62 (vinyl), 6.11 (vinyl).
[Preparation of Organic Polymer Porous Material]

An organic polymer porous material-forming composition [X-5] was prepared by mixing 97 mg of the polymerizable compound [a-4], 870 mg of EGDMA, 3 mg of AIBN, 0.8 mL of diglyme, and 0.6 mL of methanol.

Next, the composition [X-5] was placed in a polymerization tube, nitrogen gas was injected thereto for 30 minutes, and the tube was sealed and heat-treated at 70° C. for 12 hours. A white solid formed was discharged from the polymerization tube, and a Soxhlet extractor (solvent: tetrahydrofuran and methanol) was used to remove the unpolymerized components and the solvent to prepare an organic polymer porous material [P-5].

Yield: 950 mg, yield ratio: 98%.

Amino group content: 0.26 mmol/g (tertiary amino groups).

Specific surface area (BET simple method): 423 m$^2$/g.

The measuring instruments, the sample amount, and the pretreatment were the same as those in Example 1.
[Catalytic Reaction Test Using Organic Polymer Porous Material]

As in Example 1, to the reaction solution (Y1), 47 mg (amine equivalent: 12.1 mmol) of the organic polymer porous material [P-5] was added, and the reaction was conducted at room temperature for 3 hours. Analysis by gas chromatography confirmed that the target product, benzalmalononitrile was obtained at a reaction ratio of 98% or more.

The organic polymer porous material [P-5] filtered out from the reaction solution was washed with ethanol and toluene and dried. The same catalytic reaction test as one described above was repeated 5 times. It was confirmed that the reaction ratio did not decrease and the target product was obtained.

Example 6

[Synthesis of Polymerizable Compound (a)]

A polymerizable compound [a-5] was obtained as in Example 1 except that 36 mg ($2.56 \times 10^2$ µmol) of glycidyl methacrylate was used instead of 40 mg ($2.56 \times 10^2$ µmol) of 2-isocyanatoethyl methacrylate. The polymerizable compound [a-5] contained 62 tertiary amino groups and 64 vinyl groups in a molecule.

$^1$H-NMR (300 MHz, $CD_3OD$): δ/ppm 1.92, 2.35-2.37, 2.57-2.59, 2.78-2.80, 3.25-3.35, 3.42, 4.16, 5.63 (vinyl), 6.11 (vinyl).
[Preparation of Organic Polymer Porous Material]

An organic polymer porous material-forming composition [X-6] was prepared by mixing 93 mg of the polymerizable compound [a-5], 870 mg of EGDMA, 12 mg of AIBN, 4.0 mL of diglyme, and 1.0 mL of methanol.

Next, the composition [X-6] was placed in a polymerization tube, nitrogen gas was injected thereto for 30 minutes, and the tube was sealed and heat-treated at 70° C. for 12 hours. A white solid formed was discharged from the polymerization tube, and a Soxhlet extractor (solvent: tetrahydrofuran and methanol) was used to remove the unpolymerized components and the solvent to prepare an organic polymer porous material [P-6].

Yield: 926 mg, yield ratio: 95%.

Amino group content: 0.25 mmol/g (tertiary amino groups), 0.26 mmol/g (primary amino groups).

Specific surface area (BET simple method): 466 m$^2$/g.

The measuring instruments, the sample amount, and the pretreatment were the same as those in Example 1.
[Catalytic Reaction Test Using Organic Polymer Porous Material]

As in Example 1, to the reaction solution (Y1), 20 mg (amine equivalent: 10.3 µmol) of the organic polymer porous material [P-6] was added, and the reaction was conducted at room temperature for 3 hours. Analysis by gas chromatography confirmed that the target product, benzalmalononitrile was generated at a reaction ratio of 98% or more.

The organic polymer porous material [P-6] filtered out from the reaction solution was washed with ethanol and toluene and dried. The same catalytic reaction test as one described above was repeated 5 times. It was confirmed that the reaction ratio did not decrease and the target product was obtained.

Example 7

[Synthesis of Polymerizable Compound (a)]

To 0.20 g (primary amine equivalent: 1.16 mmol, secondary amine equivalent: 2.33 mmol) of polyethyleneimine (average molecular weight: 10,000, produced by Wako Pure Chemical Industries, Ltd., product code: 164-17821), 0.54 g (3.49 mmol) of 2-isocyanatoethyl methacrylate (Showa Denko K. K., product name: KarenzMOI) was added, and the mixture was stirred at room temperature for 1 day using a magnetic stirrer. Then the solvent was distilled away to obtain a target polymerizable compound [a-6]. The polymerizable compound [a-6] contained 58 tertiary amino groups and 174 vinyl groups in a molecule on average.

$^1$H-NMR (300 MHz, $CD_3OD$): δ/ppm 1.92, 2.63, 3.22-3.42, 4.15-4.22, 5.62 (vinyl), 6.11 (vinyl).

[Preparation of Organic Polymer Porous Material]

An organic polymer porous material-forming composition [X-7] was prepared by mixing 150 mg of the polymerizable compound [a-6], 1.24 g of EGDMA, 16 mg of AIBN, 5.5 mL of diglyme, and 1.5 mL of methanol.

Next, the composition [X-7] was placed in a polymerization tube, nitrogen gas was injected thereto for 30 minutes, and the tube was sealed and heat-treated at 70° C. for 12 hours. A white solid formed was discharged from the polymerization tube, and a Soxhlet extractor (solvent: tetrahydrofuran and methanol) was used to remove the unpolymerized components and the solvent to prepare an organic polymer porous material [P-7].

Yield: 1.36 g, yield ratio: 97%.

Amino group content: 0.17 mmol/g (tertiary amino groups).

Specific surface area (BET simple method): 401 m$^2$/g.

The measuring instruments, the sample amount, and the pretreatment were the same as those in Example 1.

Figure 2:
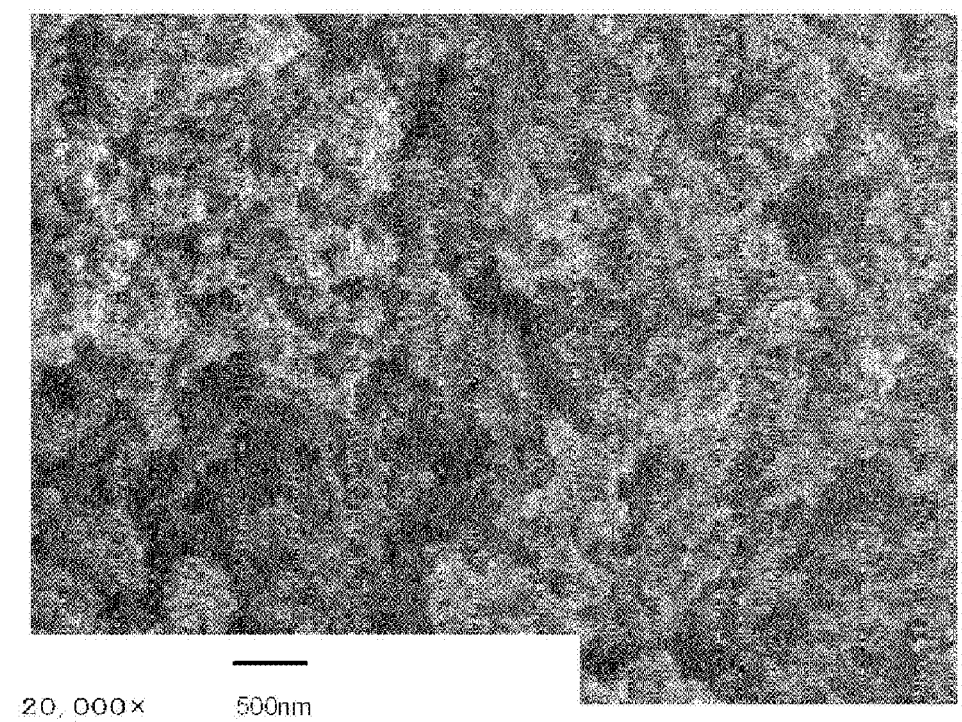
FIG. 2 is a scanning electron microscope image of an organic polymer porous material [P-7] obtained in Example 7.

Observation mode: Scanning electron microscopic image is shown in FIG. 2.

The measuring instruments were the same as those in Example 1.

[Catalytic Reaction Test Using Organic Polymer Porous Material]

As in Example 1, to the reaction solution (Y1), 30 mg (amine equivalent: 5.02 μmol) of the organic polymer porous material [P-7] was added, and the reaction was conducted at room temperature for 3 hours. Analysis by gas chromatography confirmed that the target product, benzalmalononitrile was generated at a reaction ratio of 98% or more.

The organic polymer porous material [P-7] filtered out from the reaction solution was washed with ethanol and toluene and dried. The same catalytic reaction test as one described above was repeated 5 times. It was confirmed that the reaction ratio did not decrease and the target product was obtained.

Comparative Example 1

In accordance to the method described in a patent document (Japanese Unexamined Patent Application Publication No. 2000-63513), a polymerizable compound (viscosity: 4.4 Pa·s) was synthesized from a polypropyleneimine dendrimer (product of Sigma-Aldrich, molecular weight: 316, product code: 460699) having primary amine as a reactive functional group, 2-hydroxyethyl acrylate, and 2-isocyanatoethyl methacrylate (raw material composition: 1/8/8/(molar ratio)). This polymerizable compound contained 2 tertiary amino groups and 4 vinyl groups in a molecule. The polymerizable compound was mixed with AIBN (0.01 molar equivalents relative to the vinyl groups in the polymerizable compound), the mixture was placed in a polymerization tube, and nitrogen gas was injected for 30 minutes. The polymerization tube was sealed and heat-treated at 70° C. for 12 hours to prepare a colorless non-porous comparative polymer [CP-1] (amino group content: 2.6 mmol/g).

As in Example 1, to the reaction solution (Y1), 10 mg (amine equivalent: 25.7 μmol) of the polymer [CP-1] was added, and the reaction was conducted at room temperature for 3 hours. Analysis by gas chromatography confirmed that benzalmalononitrile was produced at a reaction ratio of 32%.

The polymer was filtered out from the reaction solution, washed with toluene and diethyl ether, and subjected to the same catalytic reaction test as above. The test confirmed generation of benzalmalononitrile at a reaction ratio of 29%.

These results clearly show that the organic polymer porous materials obtained by the methods indicated in Examples 1 to 7 are better catalysts than the non-porous polymer [CP-1] obtained by the method indicated in Comparative Example 1 for the nucleophilic addition reaction of benzaldehydes.

Comparative Example 2

A colorless and transparent non-porous comparative polymer [CP-2] (amino group content: 2.8 mmol) was prepared as in Comparative Example 1 except that a polymerizable compound obtained from the same polypropyleneimine dendrimer as that described above and PEG #200 dimethacrylate (KYOEISHA CHEMICAL Co., Ltd., product name: LIGHT-ESTER 4EG) (raw material composition: 1/6 (molar ratio)) was used instead of the polymerizable compound obtained from the polypropyleneimine dendrimer having primary amino as the reactive functional group, 2-hydroxyethyl acrylate, and 2-isocyanatoethyl methacrylate (raw material composition: 1/8/8/(molar ratio)).

As in Example 1, to the reaction solution (Y1), 10 mg (amine equivalent: 27.9 μmol) of the polymer [CP-2] was added, and the reaction was conducted at room temperature for 3 hours. Analysis by gas chromatography confirmed that benzalmalononitrile was generated at a reaction ratio of 24%.

The polymer was filtered out from the reaction solution, washed with toluene and diethyl ether, and subjected to the same catalytic reaction test as above. The test confirmed generation of benzalmalononitrile at a reaction ratio of 19%.

These results clearly show that the organic polymer porous materials obtained by the methods indicated in Examples 1 to 7 are better catalysts than the non-porous polymer [CP-2] obtained by the method indicated in Comparative Example 2 for the nucleophilic addition reaction of benzaldehydes.

Comparative Example 3

Methanol was distilled away from 570 mg of generation 4 (G4) polyamidoamine (PAMAM) dendrimer (10 mass % methanol solution, product of Sigma-Aldrich, molecular weight: 14214.4, product code: 412449) containing primary amino as a reactive functional group, to obtain 57 mg of G4 (PAMAM) dendrimer in a solid form.

A porous comparative polymer [CP-3] was prepared as in Example 1 except that 57 g of the G4 (PAMAM) dendrimer was used instead of 97 mg of the polymerizable compound [a-1]. The G4 (PAMAM) dendrimer was largely extracted by Soxhlet extraction since it did not contain any vinyl groups, and it was confirmed that about 20% of the G4 (PAMAM) dendrimer relative to the amount thereof fed remained in CP-3 (yield: 850 mg, amino group content: 0.05 mmol/g (tertiary amino group)).

As in Example 1, to the reaction solution (Y1), 100 mg (amine equivalent: 5.02 μmol) of the polymer [CP-3] was added, and the reaction was conducted at room temperature for 3 hours. Analysis by gas chromatography confirmed that benzalmalononitrile was generated at a reaction ratio of 33%.

The polymer was filtered out from the reaction solution, washed with toluene and diethyl ether, and subjected to the same catalytic reaction test as above. The test confirmed that benzalmalononitrile was generated at a reaction ratio of 30%.

These results clearly show that the organic polymer porous materials obtained by the methods indicated in Examples 1 to 7 are better catalysts than the porous polymer [CP-3] obtained by the method indicated in Comparative Example 3 for the nucleophilic addition reaction of benzaldehydes.

Comparative Example 4

A polymerization composition was prepared by mixing 40 mg of dimethylaminoethyl methacrylate (KYOEISHA CHEMICAL Co., Ltd., product name: LIGHT-ESTER DM), 920 mg of EGDMA, 12 mg of AIBN, 4.0 mL of diglyme, and 1.0 mL of methanol. Next, the composition was placed in a polymerization tube, nitrogen gas was injected thereto for 30 minutes, and the tube was sealed and heat-treated at 70° C. for 12 hours. A white solid formed was discharged from the polymerization tube, and a Soxhlet extractor (solvent: tetrahydrofuran and methanol) was used to remove the unpolymerized components and the solvent to prepare a porous comparative polymer [CP-4] (amino group content: 0.26 mmol/g (tertiary amino groups).

As in Example 1, to the reaction solution (Y1), 20 mg (amine equivalent: 5.04 μmol) of the polymer [CP-4] was added, and the reaction was conducted at room temperature for 3 hours. Analysis by gas chromatography confirmed that benzalmalononitrile was generated at a reaction ratio of 55%.

The polymer was filtered out from the reaction solution, washed with toluene and diethyl ether, and subjected to the same catalytic reaction test as above. The test confirmed generation of benzalmalononitrile at a reaction ratio of 36%.

These results clearly show that the organic polymer porous materials obtained by the methods indicated in Examples 1 to 7 are better catalysts than the porous polymer [CP-4] obtained by the method indicated in Comparative Example 4 for the nucleophilic addition reaction of benzaldehydes.

Example 8

[Synthesis of Polymerizable Compound (a)]

A polymerizable compound [a-1] was obtained as in Example 1.

[Preparation of Organic Polymer Porous Material]

In 1.40 mL of N,N-dimethylformamide (referred to as "DMF" hereinafter), 194 mg of the polymerizable compound [a-1] was dissolved. Thereto, 1.60 mL ($Pd^{2+}$ equivalent: 320 μmol) of a DMF solution (0.2 mol·$L^{-1}$) of palladium acetate was added, and the mixture was stirred at room temperature for 30 minutes using a magnetic stirrer. Thereto, 1.74 g of EGDMA, 20 mg of AIBN, 4.0 mL of diglyme, and 6.0 mL of DMF were added to form an organic polymer porous material-forming composition [X-8].

Next, the composition [X-8] was placed in a polymerization tube, nitrogen gas was injected thereto for 30 minutes, and the tube was sealed and heat-treated at 70° C. for 12 hours. A pale yellow solid formed was discharged from the polymerization tube, and a Soxhlet extractor (solvent: tetrahydrofuran and methanol) was used to remove the unpolymerized components and the solvent to prepare an organic polymer porous material [P-8].

Yield: 1.89 g, yield ratio: 97%.

Specific surface area (BET simple method): 470 $m^2/g$.

The measuring instruments, the sample amount, and the pretreatment were the same as those in Example 1.

Metal content: 0.16 mmol/g.

Measuring instrument: thermo gravimetry/differential thermal analyzer EXSTAR 6000 TG/DTA Sample amount: about 0.05 g Measurement temperature range: 30 to 1000° C.

Figure 3:
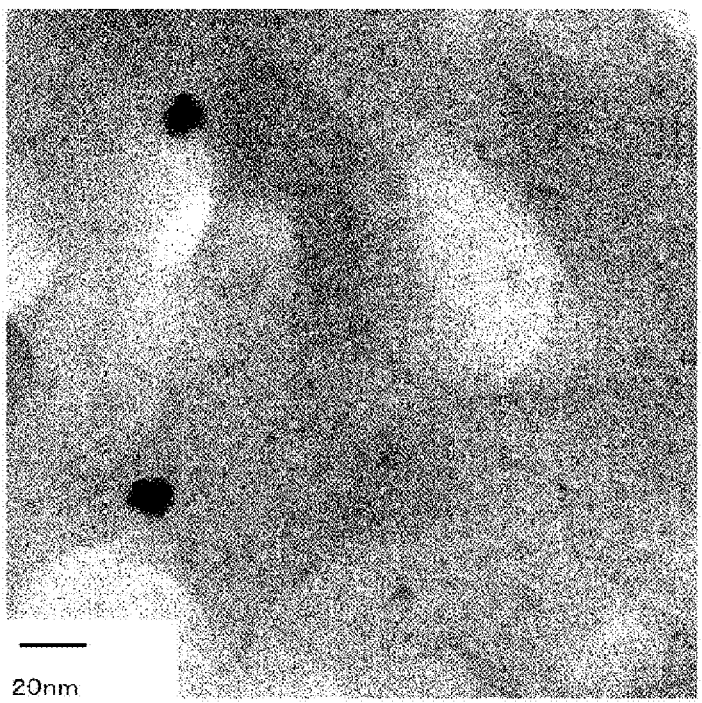
FIG. 3 is a transmission electron microscope image of an organic polymer porous material [P-8] obtained in Example 8.

Average particle size of metal nanoparticles (transmission electron microscope analysis): 2.5 nm A transmission electron microscopic image is shown in FIG. 3.

Instrument: transmission electron microscope JEM-2200FS (Jeol Ltd.)

Acceleration voltage: 200 kV

Particle size distribution analysis software: Mac-View (Mountech Co., Ltd.)

Number of particles subject to analysis: 100 or more

Figure 4:
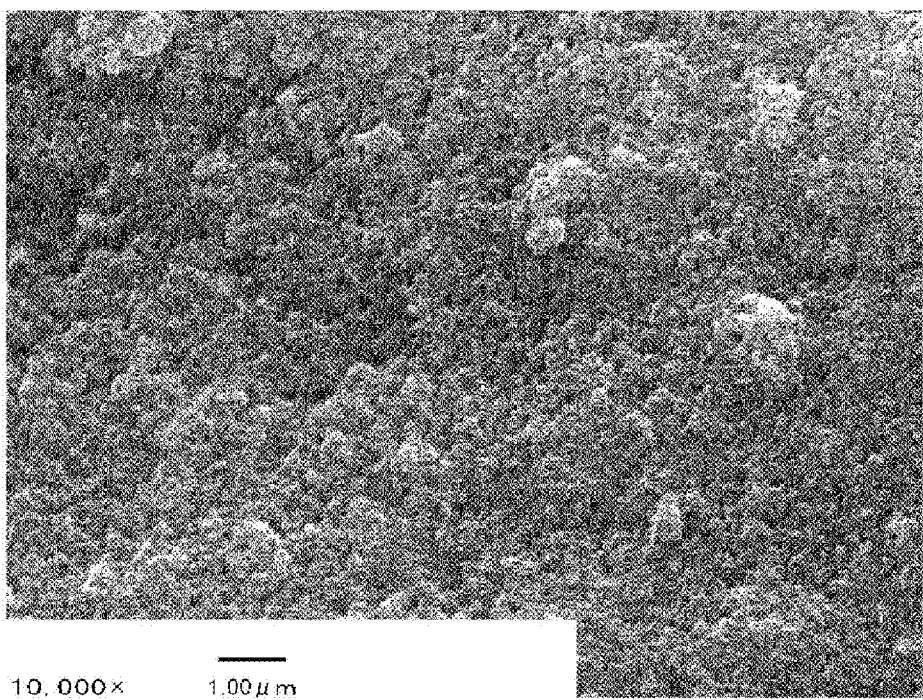
FIG. 4 is a scanning electron microscope image of an organic polymer porous material containing metal nanoparticles [P-8] obtained in Example 8.

Observation mode: Scanning electron microscopic image is shown in FIG. 4.

The measuring instruments were the same as those in Example 1.

[Catalytic Reaction Test Using Organic Polymer Porous Material]

A reaction solution (Y2) was prepared by mixing 0.65 mmol of 4-bromoacetophenone, 0.86 mmol of phenyl boronic acid, 2.0 mmol of potassium carbonate, and 3 mL of water. Thereto, 41.0 mg of the organic polymer porous material [P-8] (Pd equivalent: 6.5 μmol) was added and the reaction was conducted at 80° C. for 4 hours. Analysis by gas chromatography confirmed that the target product, 4-acetylbiphenyl was generated at a reaction ratio of 95% or more.

The organic polymer porous material [P-8] filtered out from the reaction solution was washed with water and diethyl ether alternately for four times each, and dried. The same catalytic reaction test as one described above was repeated 5 times. It was confirmed that the reaction ratio did not decrease and the target product was obtained.

Example 9

[Synthesis of Polymerizable Compound (a)]

A polymerizable compound [a-1] was obtained as in Example 1.

[Preparation of Organic Polymer Porous Material]

In 0.7 mL of DMF, 97 mg of the polymerizable compound [a-1] was dissolved. Thereto, 0.8 mL ($Pd^{2+}$ equivalent: 160 μmol) of a DMF solution (0.2 mol·$L^{-1}$) of palladium acetate was added, and the mixture was stirred at room temperature for 30 minutes using a magnetic stirrer. Thereto, 3 g of AIBN, 2.0 mL of diglyme, and 1.5 mL of DMF were added to form an organic polymer porous material-forming composition [X-9].

Next, the composition [X-9] was placed in a polymerization tube, nitrogen gas was injected thereto for 30 minutes, and the tube was sealed and heat-treated at 70° C. for 12 hours. A pale yellow solid formed was discharged from the polymerization tube, and a Soxhlet extractor (solvent: tetrahydrofuran and methanol) was used to remove the unpolymerized components and the solvent to prepare an organic polymer porous material [P-9].

Yield: 110 mg, yield ratio: 94%.

Specific surface area (BET simple method): 254 $m^2/g$.

The measuring instruments, the sample amount, and the pretreatment were the same as those in Example 1.

Metal content: 1.4 mmol/g.

The measuring instruments, the sample amount, and the measurement temperature range were the same as those in Example 8.

Average particle size of metal nanoparticles (TEM analysis): 2.9 nm

[Catalytic Reaction Test Using Organic Polymer Porous Material]

As in Example 8, to the reaction solution (Y2), 2 mg (Pd equivalent: 2.74 μmol) of the organic polymer porous material [P-9] was added, and the reaction was conducted at 80° C. for 4 hours. Analysis by gas chromatography confirmed that the reaction ratio was 95% or more and generation of the target product, 4-acetylbiphenyl.

The organic polymer porous material [P-9] filtered out from the reaction solution was washed with water and diethyl ether alternately for four times each, and dried. The same catalytic reaction test as one described above was repeated 5 times. It was confirmed that the target product was obtained without decreasing the reaction ratio.

Example 10

[Synthesis of Polymerizable Compound (a)]
A polymerizable compound [a-4] was obtained as in Example 5.
[Preparation of Organic Polymer Porous Material]
In 0.7 mL of DMF, 97 mg of the polymerizable compound [a-4] was dissolved. Thereto, 0.8 mL ($Pd^{2+}$ equivalent: 160 μmol) of a DMF solution (0.2 mol·$L^{-1}$) of palladium acetate was added, and the mixture was stirred at room temperature for 30 minutes using a magnetic stirrer. Thereto, 870 mg of EGDMA, 10 mg of AIBN, 2.0 mL of diglyme, and 3.0 mL of DMF were added to form an organic polymer porous material-forming composition [X-10].

Next, the composition [X-10] was placed in a polymerization tube, nitrogen gas was injected thereto for 30 minutes, and the tube was sealed and heat-treated at 70° C. for 12 hours. A pale yellow solid formed was discharged from the polymerization tube, and a Soxhlet extractor (solvent: tetrahydrofuran and methanol) was used to remove the unpolymerized components and the solvent to prepare an organic polymer porous material [P-10].
Yield: 940 mg, yield ratio: 97%.
Specific surface area (BET simple method): 445 $m^2/g$.
The measuring instruments, the sample amount, and the pretreatment were the same as those in Example 1.
Metal content: 0.16 mmol/g.
The measuring instruments, the sample amount, and the measurement temperature range were the same as those in Example 8.
Average particle size of metal nanoparticles (TEM analysis): 2.4 nm
[Catalytic Reaction Test Using Organic Polymer Porous Material]
As in Example 8, to the reaction solution (Y2), 41.0 mg (Pd equivalent: 6.7 μmol) of the organic polymer porous material [P-10] was added, and the reaction was conducted at 80° C. for 4 hours. Analysis by gas chromatography confirmed that the target product, 4-acetylbiphenyl was generated at a reaction ratio of 95% or more.

The organic polymer porous material [P-10] filtered out from the reaction solution was washed with water and diethyl ether alternately for four times each, and dried. The same catalytic reaction test as one described above was repeated 5 times. It was confirmed that the target product was obtained without decreasing the reaction ratio.

Example 11

[Synthesis of Polymerizable Compound (a)]
A polymerizable compound [a-5] was obtained as in Example 6.
[Preparation of organic polymer porous material]
In 1.40 mL of DMF, 186 mg of the polymerizable compound [a-5] was dissolved. Thereto, 1.60 mL ($Pd^{2+}$ equivalent: 320 μmol) of a DMF solution (0.2 mol·$L^{-1}$) of palladium acetate was added, and the mixture was stirred at room temperature for 30 minutes using a magnetic stirrer. Thereto, 1.74 g of EGDMA, 20 mg of AIBN, 4.0 mL of diglyme, and 6.0 mL of DMF were added to form an organic polymer porous material-forming composition [X-11].

Next, the composition [X-11] was placed in a polymerization tube, nitrogen gas was injected thereto for 30 minutes, and the tube was sealed and heat-treated at 70° C. for 12 hours. A pale yellow solid formed was discharged from the polymerization tube, and a Soxhlet extractor (solvent: tetrahydrofuran and methanol) was used to remove the unpolymerized components and the solvent to prepare an organic polymer porous material [P-11].
Yield: 1.85 g, yield ratio: 95%.
Specific surface area (BET simple method): 423 $m^2/g$.
The measuring instruments, the sample amount, and the pretreatment were the same as those in Example 1.
Metal content: 0.16 mmol/g.
The measuring instruments, the sample amount, and the measurement temperature range were the same as those in Example 8.
Average particle size of metal nanoparticles (TEM analysis): 3.4 nm
[Catalytic Reaction Test Using Organic Polymer Porous Material]
As in Example 8, to the reaction solution (Y2), 38.0 mg (Pd equivalent: 6.2 μmol) of the organic polymer porous material [P-11] was added, and the reaction was conducted at 80° C. for 4 hours. Analysis by gas chromatography confirmed that the target product, 4-acetylbiphenyl was generated at a reaction ratio of 95% or more.

The organic polymer porous material [P-11] filtered out from the reaction solution was washed with water and diethyl ether alternately for four times each, and dried. The same catalytic reaction test as one described above was repeated 5 times. It was confirmed that the target product was obtained without decreasing the reaction ratio.

Example 12

[Synthesis of Polymerizable Compound (a)]
A polymerizable compound [a-6] was obtained as in Example 7.
[Preparation of Organic Polymer Porous Material]
In 1.2 mL of DMF, 150 mg of the polymerizable compound [a-6] was dissolved. Thereto, 0.8 mL ($Pd^{2+}$ equivalent: 160 μmol) of a DMF solution (0.2 mol·$L^{-1}$) of palladium acetate was added, and the mixture was stirred at room temperature for 30 minutes using a magnetic stirrer. Thereto, 1.24 g of EGDMA, 16 mg of AIBN, 2.0 mL of diglyme, and 3.0 mL of DMF were added to form an organic polymer porous material-forming composition [X-12].

Next, the composition [X-12] was placed in a polymerization tube, nitrogen gas was injected thereto for 30 minutes, and the tube was sealed and heat-treated at 70° C. for 12 hours. A pale yellow solid formed was discharged from the polymerization tube, and a Soxhlet extractor (solvent: tetrahydrofuran and methanol) was used to remove the unpolymerized components and the solvent to prepare an organic polymer porous material [P-12].
Yield: 1.36 g, yield ratio: 97%.
Specific surface area (BET analysis): 432 $m^2/g$.
The measuring instruments, the sample amount, and the pretreatment were the same as those in Example 1.
Metal content: 0.11 mmol/g.
The measuring instruments, the sample amount, and the measurement temperature range were the same as those in Example 8.
Average particle size of metal nanoparticles (TEM analysis): 2.6 nm

[Catalytic Reaction Test Using Organic Polymer Porous Material]

As in Example 8, to the reaction solution (Y2), 58.8 mg (Pd equivalent: 6.7 μmol) of the organic polymer porous material [P-12] was added, and the reaction was conducted at 80° C. for 4 hours. Analysis by gas chromatography confirmed that the target product, 4-acetylbiphenyl was generated at a reaction ratio of 95% or more.

The organic polymer porous material [P-12] filtered out from the reaction solution was washed with water and diethyl ether alternately for four times each, and dried. The same catalytic reaction test as one described above was repeated 5 times. It was confirmed that the target product was obtained without decreasing the reaction ratio.

Comparative Example 5

As in Example 1, 194 mg of the synthesized polymerizable compound [a-1] was dissolved in 1.40 mL of DMF, and 1.60 mL ($Pd^{2+}$ equivalent: 320 μmol) of a DMF solution (0.2 mol·$L^{-1}$) of palladium acetate was added thereto. The mixture was stirred at room temperature for 30 minutes using a magnetic stirrer. Thereto, 1.78 g of PEG #200 dimethacrylate (LIGHT-ESTER 4EG) and 20 mg of AIBN were added, the mixture was placed in a polymerization tube, and nitrogen gas was injected for 30 minutes. The polymerization tube was sealed and heat-treated at 70° C. for 12 hours to prepare a non-porous comparative polymer [CP-5] (metal content: 0.15 mmol/g).

As in Example 8, to the reaction solution (Y2), 40.5 mg of the polymer [CP-5] (Pd equivalent: 6.2 μmol) was added, and the reaction was conducted at 80° C. for 4 hours. Analysis by gas chromatography confirmed that the target product, 4-acetylbiphenyl was generated at a reaction ratio of 10%.

The polymer [CP-5] was filtered out from the reaction solution, washed with water and diethyl ether alternately for four times each, dried, and subjected to the same catalytic reaction test as above. The test confirmed generation of 4-acetylbiphenyl at a reaction ratio of 5%.

These results clearly show that the organic polymer porous materials obtained by the methods indicated in Examples 8 to 12 are better catalysts than the non-porous polymer [CP-5] obtained by the method indicated in Comparative Example 5 for the coupling reaction of 4-bromoacetophenone.

Comparative Example 6

Methanol was distilled away from 1.14 g of generation 4 (G4) polyamidoamine (PAMAM) dendrimer (10 mass % methanol solution, product of Sigma-Aldrich, molecular weight: 14214.4, product code: 412449) containing primary amino as a reactive functional group, to obtain 114 mg of G4 (PAMAM) dendrimer in a solid form.

A non-porous comparative polymer [CP-6] (metal content: 0.16 mmol/g) was prepared as in Comparative Example 5 except that 114 mg of the solid G4 (PAMAM) dendrimer was used instead of 194 mg of the polymerizable compound [a-1].

As in Example 8, to the reaction solution (Y2), 39.5 mg of the polymer [CP-6] (Pd equivalent: 6.4 μmol) was added, and the reaction was conducted at 80° C. for 4 hours. Analysis by gas chromatography confirmed that the target product, 4-acetylbiphenyl was generated at a reaction ratio of 7%.

The polymer [CP-6] was filtered out from the reaction solution, washed with water and diethyl ether alternately for four times each, dried, and subjected to the same catalytic reaction test as above. The test confirmed generation of 4-acetylbiphenyl at a reaction ratio of 6%.

These results clearly show that the organic polymer porous materials obtained by the methods indicated in Examples 8 to 12 are better catalysts than the non-porous polymer [CP-6] obtained by the method indicated in Comparative Example 6 for the coupling reaction of 4-bromoacetophenone.

Comparative Example 7

By the same method as in Comparative Example 6, 114 mg of a solid G4 (PAMAM) dendrimer was obtained. A porous comparative polymer [CP-7] was prepared as in Example 8 except that 114 mg of the G4 (PAMAM) dendrimer was used instead of 194 mg of the polymerizable compound [a-1]. The G4 (PAMAM) dendrimer and Pd ions were largely extracted by Soxhlet extraction since the G4 (PAMAM) dendrimer did not contain any vinyl groups, and it was confirmed that about 20% of the G4 (PAMAM) dendrimer relative to the amount thereof fed and about 40% of Pd remained in CP-7 (yield: 1.81 g, metal content: 0.07 mmol/g).

As in Example 8, to the reaction solution (Y2), 85.5 mg (Pd equivalent: 6.0 μmol) of the polymer [CP-7] was added, and the reaction was conducted at 80° C. for 4 hours. Analysis by gas chromatography confirmed that the target product, 4-acetylbiphenyl was generated at a reaction ratio of 21%.

The polymer [CP-7] was filtered out from the reaction solution, washed with water and diethyl ether alternately for four times each, dried, and subjected to the same catalytic reaction test as above. The test confirmed generation of 4-acetylbiphenyl at a reaction ratio of 13%.

These results clearly show that the organic polymer porous materials obtained by the methods indicated in Examples 8 to 12 are better catalysts than the porous polymer [CP-7] obtained by the method indicated in Comparative Example 7 for the coupling reaction of 4-bromoacetophenone.

Comparative Example 8

In 1.40 mL of DMF, 80 mg of LIGHT-ESTER DM was dissolved. Thereto, 1.60 mL ($Pd^{2+}$ equivalent: 320 μmol) of a DMF solution (0.2 mol·$L^{-1}$) of palladium acetate was added, and the mixture was stirred at room temperature for 30 minutes using a magnetic stirrer. Thereto, 1.78 g of EGDMA, 20 mg of AIBN, 4.0 mL of diglyme, and 6.0 mL of DMF were added to prepare a polymerization composition. Next, the composition was placed in a polymerization tube, nitrogen gas was injected thereto for 30 minutes, and the tube was sealed and heat-treated at 70° C. for 12 hours. A pale yellow solid formed was discharged from the polymerization tube, and a Soxhlet extractor (solvent: tetrahydrofuran and methanol) was used to remove the unpolymerized components and the solvent to prepare a porous comparative polymer [CP-8] (metal content: 0.15 mmol/g, average size of metal nanoparticles (TEM analysis): 2.1 nm).

As in Example 8, to the reaction solution (Y2), 40.0 mg (Pd equivalent: 6.2 μmol) of the polymer [CP-8] was added, and the reaction was conducted at 80° C. for 4 hours. Analysis by gas chromatography confirmed that the target product, 4-acetylbiphenyl was generated at a reaction ratio of 59%.

The polymer [CP-8] was filtered out from the reaction solution, washed with water and diethyl ether alternately for four times each, dried, and subjected to the same catalytic reaction test as above. The test confirmed generation of 4-acetylbiphenyl at a reaction ratio of 20%.

These results clearly show that the organic polymer porous materials obtained by the methods indicated in Examples 8 to 12 are better catalysts than the non-porous polymer [CP-8]

obtained by the method indicated in Comparative Example 8 for the coupling reaction of 4-bromoacetophenone.

The invention claimed is:

1. An organic polymer porous material comprising a polymer ($P_A$) obtained from a polymerizable composition (A) containing a polymerizable compound (a) having amino and vinyl groups,
wherein the polymerizable compound (a) is a compound obtained by reacting
(1) a dendrimer (a1) having a tertiary amino group and a reactive functional group ($Q_1$) or a polyethyleneimine (a2) having a reactive functional group ($Q_1$), and
(2) a compound (a3) having a vinyl group and a reactive functional group ($Q_2$) that can react with the reactive functional group ($Q_1$).

2. The organic polymer porous material according to claim 1, wherein the reactive functional group ($Q_1$) is a primary amino group, a secondary amino group, a hydroxyl group, or a carboxy group and the reactive functional group ($Q_2$) is an isocyanate group, an epoxy group, a primary amino group, a secondary amino group, a hydroxyl group, a carboxy group, or a halogenated acyl group.

3. The organic polymer porous material according to claim 1, wherein the dendrimer (a1) has a repeating unit represented by formula (1)

[Chem. 1]

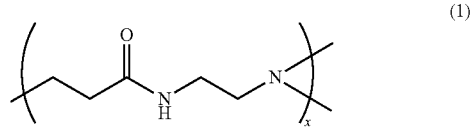

(1)

(in formula (1), x is an integer of 1 to 10) or formula (2)

[Chem. 2]

(2)

(in formula (2), y is an integer of 1 to 10).

4. The organic polymer porous material according to claim 1, further comprising metal nanoparticles complexed with the polymer ($P_A$).

5. The organic polymer porous material according to claim 4, wherein the metal nanoparticles are nanoparticles of at least one metal selected from the group consisting of palladium, platinum, ruthenium, rhodium, gold, silver, and rhenium.

6. A catalyst comprising the organic polymer porous material according to claim 1.

7. A method for producing the organic polymer porous material according to claim 1, the method comprising polymerizing an organic polymer porous material-forming composition (X) prepared by mixing a polymerizable composition (A) containing a polymerizable compound (a) having amino and vinyl groups and a solvent (M) that is compatible with the polymerizable composition (A) but does not dissolve or swell a polymer ($P_A$) obtained from the polymerizable composition (A), and then removing the solvent (M) (step (α-1)).

8. A method for producing the organic polymer porous material according to claim 4, the method comprising performing a step (β-1) of preparing an organic polymer porous material-forming composition (Y) obtained by mixing a polymerizable composition (A) containing a polymerizable compound (a) having amino and vinyl groups, a metal compound (b), and a solvent (M) that is compatible with the polymerizable composition (A) and the metal compound (b) but does not dissolve or swell a polymer ($P_A$) obtained from the polymerizable composition (A), polymerizing the composition (Y) while reducing the metal compound (b) at the same time to generate metal nanoparticles, and then removing the solvent (M).

9. The method for producing the organic polymer porous material according to claim 8, further comprising performing, after the step (β-1), a step (β-2) of bringing the organic polymer porous material obtained in the step (β-1) into contact with a solution (H) containing a reductant (c) and separating the organic polymer porous material from the solution (H).

10. A method for producing the organic polymer porous material according to claim 4, comprising sequentially performing (1) a step (α-1) of polymerizing an organic polymer porous material-forming composition (X) prepared by mixing a polymerizable composition (A) containing a polymerizable compound (a) having amino and vinyl groups and a solvent (M) that is compatible with the polymerizable composition (A) but does not dissolve or swell a polymer ($P_A$) obtained from the polymerizable composition (A) so as to form an organic polymer porous material, and then removing the solvent (M), a step (β-3) of bringing the organic polymer porous material into contact with a solution (I) containing a metal compound (b) to allow the metal compound (b) to adsorb onto the organic polymer porous material and then separating the organic polymer porous material from the solution (I), and (2) a step (β-4) of bringing the organic polymer porous material into contact with a solution (H) containing a reductant (c) to reduce the metal compound (b) to generate metal nanoparticles, and then separating the organic polymer porous material containing the generated metal nanoparticles from the solution (H).

* * * * *